(12) United States Patent
Shukla

(10) Patent No.: US 10,750,433 B1
(45) Date of Patent: Aug. 18, 2020

(54) GATEWAY SELECTION IN A MESH NETWORK

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

(*) Notice: Subject to any disclaimer, the term of this patent is extended or adjusted under 35 U.S.C. 154(b) by 147 days.

(21) Appl. No.: 16/132,002

(22) Filed: Sep. 14, 2018

(51) Int. Cl.
| | |
|---|---|
| *H04W 48/10* | (2009.01) |
| *H04W 24/04* | (2009.01) |
| *H04W 48/00* | (2009.01) |
| *H04W 84/18* | (2009.01) |
| *H04W 88/16* | (2009.01) |

(52) U.S. Cl.
CPC ........... *H04W 48/10* (2013.01); *H04W 24/04* (2013.01); *H04W 48/17* (2013.01); *H04W 84/18* (2013.01); *H04W 88/16* (2013.01)

(58) Field of Classification Search
CPC ..... H04W 48/10; H04W 24/04; H04W 48/17; H04W 84/18; H04W 88/16
See application file for complete search history.

(56) References Cited

U.S. PATENT DOCUMENTS

| | | | | |
|---|---|---|---|---|
| 10,445,287 | B2* | 10/2019 | Solihin | .................. H04L 49/109 |
| 2002/0174235 | A1* | 11/2002 | Likourezos | ............ G06Q 30/06 709/228 |
| 2005/0132234 | A1* | 6/2005 | Dawson | .................. H04L 63/04 726/4 |
| 2005/0182724 | A1* | 8/2005 | Willard | .................. G06Q 20/04 705/44 |
| 2008/0170550 | A1* | 7/2008 | Liu | ........................ H04L 49/602 370/338 |
| 2010/0074194 | A1* | 3/2010 | Liu | .......................... H04L 45/26 370/329 |
| 2012/0044806 | A1* | 2/2012 | Park | ...................... H04W 40/22 370/230 |

(Continued)

*Primary Examiner* — Ajay Cattungal
(74) *Attorney, Agent, or Firm* — Lowenstein Sandler LLP

(57) ABSTRACT

Technology for gateway selection in a mesh network is described. In one embodiment, upon restart of a root node in the mesh network, the root node generates first Root Node Announcement (RANN) information and sends one or more announcement messages comprising the first RANN information to other mesh nodes in the mesh network. The RANN information comprises information about a type of backhaul connection between the root node and one or more network resources external to the mesh network and information about a cost metric defining a cost associated with utilizing the root node computing device to access the one or more network resources for each of one or more mesh nodes in the mesh network since those one or more mesh nodes do not have direct access to the one or more network resources. When the root node has sent a number of announcement messages that meets or exceeds a threshold amount determined in view of a total number of mesh nodes in the mesh network, the root node starts sending announcement messages with a second frequency that is lower than the first frequency.

20 Claims, 12 Drawing Sheets

(56) References Cited

U.S. PATENT DOCUMENTS

| | | | |
|---|---|---|---|
| 2015/0245202 A1* | 8/2015 | Patil | H04W 12/04 |
| | | | 380/279 |
| 2017/0105129 A1* | 4/2017 | Teplin | H04W 24/02 |
| 2017/0265268 A1* | 9/2017 | Couch | H04W 4/06 |
| 2018/0042083 A1* | 2/2018 | Couch | H05B 45/58 |
| 2018/0128437 A1* | 5/2018 | Coombes | H05B 39/041 |

\* cited by examiner

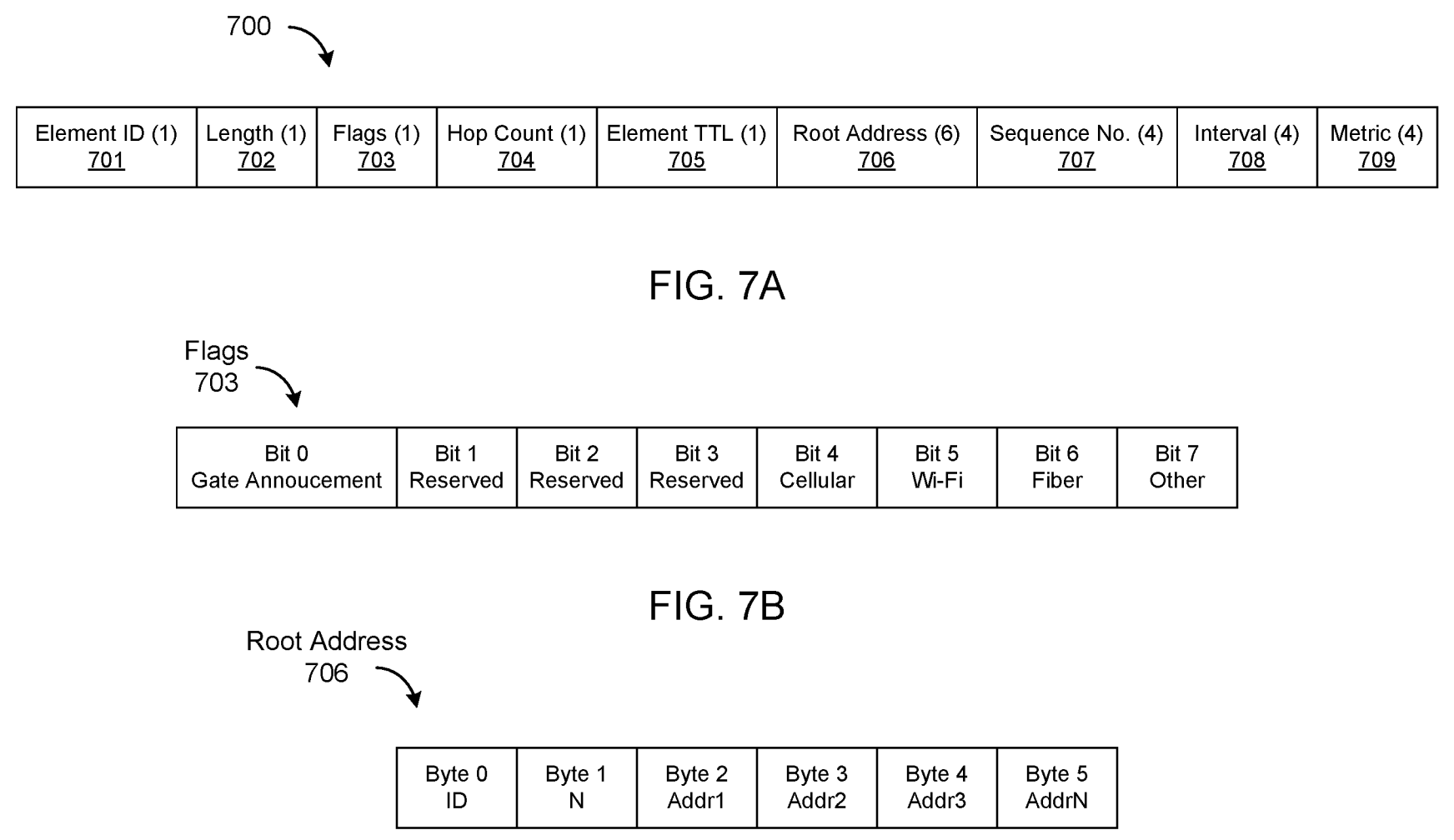

| Element ID (1) 701 | Length (1) 702 | Flags (1) 703 | Hop Count (1) 704 | Element TTL (1) 705 | Root Address (6) 706 | Sequence No. (4) 707 | Interval (4) 708 | Metric (4) 709 |

Flags 703

| Bit 0 Gate Annoucement | Bit 1 Reserved | Bit 2 Reserved | Bit 3 Reserved | Bit 4 Cellular | Bit 5 Wi-Fi | Bit 6 Fiber | Bit 7 Other |

FIG. 7B

Root Address 706

| Byte 0 ID | Byte 1 N | Byte 2 Addr1 | Byte 3 Addr2 | Byte 4 Addr3 | Byte 5 AddrN |

FIG. 7C

GATEWAY SELECTION IN A MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 7A is a block diagram illustrating a Root Node Announcement (RANN) information element, according to an embodiment.

FIG. 7B is a block diagram illustrating a modified flags field of a RANN information element, according to an embodiment.

FIG. 7C is a block diagram illustrating a modified root address field of a RANN information element, according to an embodiment.

DETAILED DESCRIPTION

Figure 1:
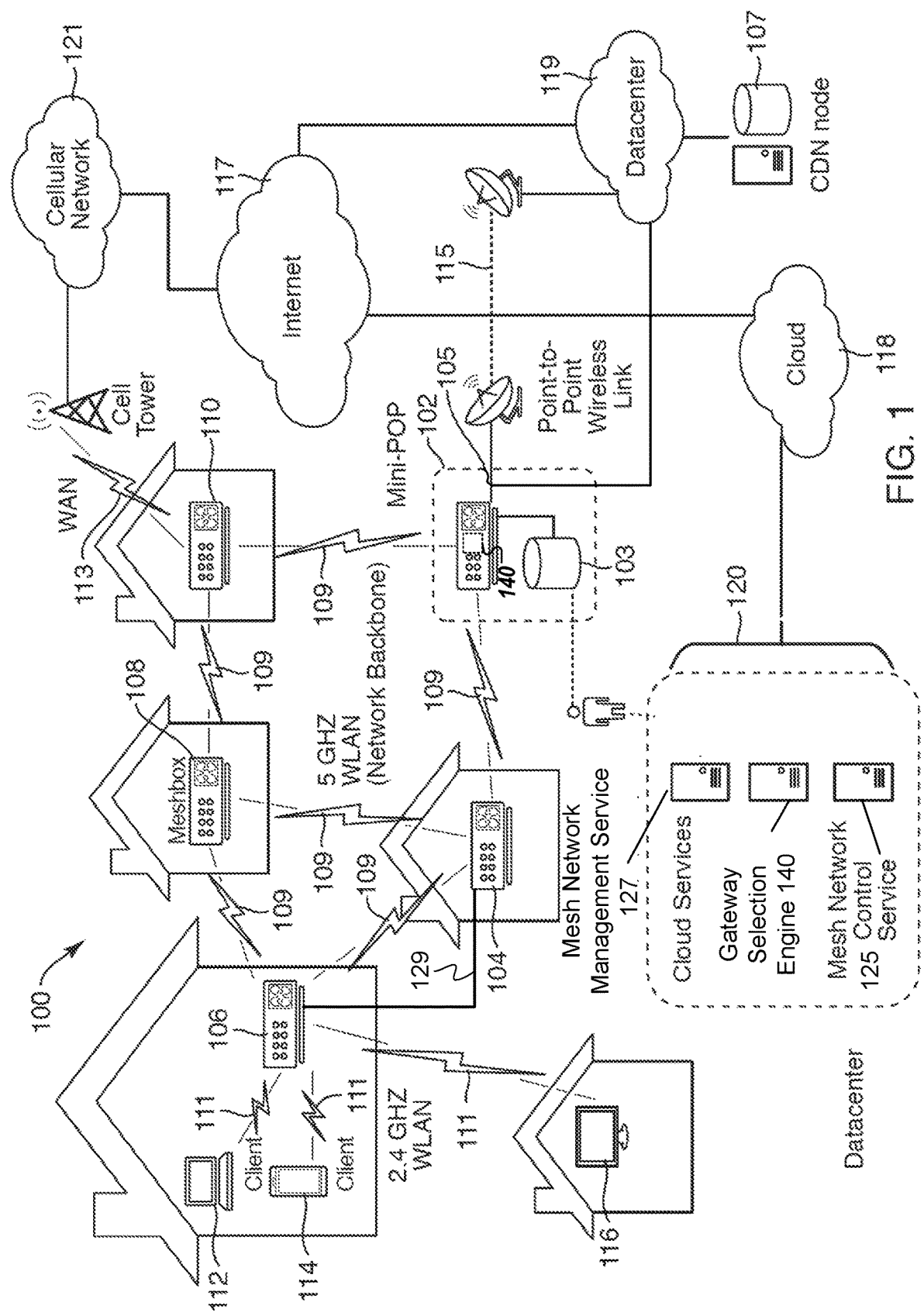
FIG. 1 is a network diagram of network hardware devices organized in a mesh network for content distribution to client devices in an environment of limited connectivity to broadband Internet infrastructure, according to an embodiment.

Technology for gateway selection in a mesh network is described herein. Nodes of a mesh network may establish peer-to-peer wireless links for sharing data. In an illustrative example, a mesh network may be employed for digital content distribution to client consumption devices in an environment of limited connectivity to broadband Internet infrastructure (e.g., for the delivery of media content to homes in dense urban areas). In one embodiment, the mesh network uses 802.11s based Wi-Fi mesh networking to provide connectivity for the distribution of content. The nodes of the mesh network may form a content distribution network (CDN) and client consumption devices connected to these nodes can receive content from the CDN.

In one embodiment, most nodes in the mesh network lack access to network resources outside the mesh network. Those nodes rely on certain gateway mesh nodes (also referred to herein as root nodes) to reach those external resources (e.g., the Internet, cloud services) and to communicate outside of the mesh network. The gateway nodes may broadcast announcement messages to the other mesh nodes in the mesh network to advertise the availability of Internet access. Depending on the embodiment, the announcement messages may include at least one of a Gateway Announcement (GANN) information element or a Root Node Announcement (RANN) information element, which include information about the gateway node that can be used by the mesh nodes to access the external resources. In many mesh networks, there may be more than one root node, acting as network gateways. As per the existing standard, a regular mesh node chooses at most one gateway based on path metrics representing the relative cost of data transmission from the corresponding node to the root node (i.e., gateway). When the root nodes acting as gateways periodically broadcast frames containing the RANN/GANN elements, the receiving nodes can update stored gateway information based on the path metric to reach the RANN/GANN originator (i.e., the root node). An active path to root node may be maintained for a fixed lifetime defined by a lifetime value.

After the gateway initially boots up or restarts after a period non-operation (e.g., once power is restored after a power loss), it takes a fairly significant amount of time to propagate gateway information throughout all the nodes in the mesh network. This is especially true for the nodes on the edges of the network for which the gateway information must pass through a large number of intermediate nodes. In one embodiment, these issues can be addressed by having the gateway send RANN/GANN elements in announcement messages with a shorter interval. Once the mesh network becomes steady, however, this frequent broadcast overhead is undesired, so the interval between announcement messages can be increased.

In addition, frequent gateway switching by a mesh node can result in out of order packet delivery and path changes. This may happen when a broadcast RANN/GANN is lost along the path from the root node to the mesh node. If the node has to keep updating gateway information based on multiple RANNs originated from different gateways, it may affect system performance. Also, there is presently no reliable way to predict when gateway nodes will go down for various reasons, such running out of battery, thermal extremes, or backhaul connectivity failures. A means of proactive notification from the gateway to the mesh nodes would help those nodes begin the process of switching to a new gateway sooner to prevent a service interruption.

Furthermore, mesh nodes presently are not able to tell a type of backhaul link that a certain gateway uses to access external network resources. Depending on the embodiment, certain types of backhaul links, or multiple options, may be preferable and useful for a mesh node in deciding which gateway node to utilize. For example, a hardwired Ethernet backhaul link may be preferred when compared to a cellular backhaul connection. Mesh nodes are also presently limited to storing gateway information for only a single gateway, but storing a both primary and secondary (e.g., back-up) gateway information could allow the mesh nodes to transition to a new gateway more efficiently in the event that the primary gateway becomes unavailable.

FIG. 1 is a network diagram of network hardware devices 102, 104, 106, 108, and 110, organized in mesh network 100, for content distribution to client consumption devices in an environment of limited connectivity to broadband Internet infrastructure, according to one embodiment. The mesh network 100 includes multiple network hardware devices 102, 104, 106, 108, and 110 that connect together to transfer digital content through the mesh network 100 to be delivered to one or more client consumption devices connected to the mesh network 100. In the depicted embodiment, the mesh network 100 includes a miniature point-of-presence (mini-POP) device 102 (also referred to as a mini-POP device), having a first wired connection to an attached storage device 103 and potentially at least one of a wired connection 105 or point-to-point wireless connection 115 to a content delivery network (CDN) device 107 (server of a CDN or a CDN node) of an Internet Service Provider (ISP), or both. The CDN device 107 may be a POP device, an edge server, a content server device, or another device of the CDN. The mini-POP device 102 may be similar to POP devices of a CDN in operation. However, the mini-POP device 102 is called "miniature" to differentiate it from a POP device of a CDN given the nature of the mini-POP device 102 being a single ingress point to the mesh network 100; whereas, the POP device of a CDN may be one of many in the CDN.

The point-to-point wireless connection 115 may be established over a point-to-point wireless link 115 between the mini-POP device 102 and the CDN device 107. Alternatively, the point-to-point wireless connection 115 may be established over a directional microwave link between the mini-POP device 102 and the CDN device 107. In other embodiments, the mini-POP device 102 is a single ingress node of the mesh network 100 for the content files stored in the mesh network 100. Thus, the mini-POP 102 may be the only node in the mesh network 100 having access to the attached storage and/or a communication channel to retrieve content files stored outside of the mesh network 100. In other embodiments, multiple mini-POP devices may be deployed in the mesh network 100, but the number of mini-POP devices may be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. All of the network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless connection 115. The point-to-point wireless connection 115 can be considered a broadband connection for the mesh network 100. In some cases, the mini-POP device 102 does not have an Internet connection via the point-to-point wireless connection 115 and the content is stored only in the attached storage device 103 for a self-contained mesh network 100. In such cases, the content in the attached storage can be manually refreshed from time to time.

The mesh network 100 also includes multiple mesh nodes 104, 106, 108, and 110 (also referred to herein as meshbox nodes and network hardware devices). The mesh nodes 104, 106, 108, and 110 may establish multiple P2P wireless connections 109 between mesh nodes 104, 106, 108, and 110 to form a network backbone. It should be noted that only some of the possible P2P wireless connections 109 are shown between the mesh nodes 104, 106, 108, and 110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection 109. In addition, one or more of the mesh nodes 104, 106, 108, and 110 may be connected via a wired communication link. In particular, the first mesh node 104 is coupled to the second mesh node 106 via a wired communication link 129. In embodiments, where mesh network 100 includes both wireless communication links 109 and at least one wired communication link 129, the mesh network 100 may be referred to herein as a "hybrid" mesh network. The mesh nodes 104, 106, 108, and 110 (and the mini-POP device 102) may be MRMC mesh network devices. As described herein, the mesh nodes 104, 106, 108, and 110 do not necessarily have reliable access to the CDN device 107. The mesh nodes 104, 106, 108, and 110 (and the mini-POP device 102) wirelessly communicate with other nodes via the network backbone via a first set of WLAN channels reserved for inter-node communications. The mesh nodes 102, 104, 106, 108, and 110 communicate data with one another via the first set of WLAN channels at a first frequency of approximately 5 GHz (e.g., 5 GHz band of the Wi-Fi® network technologies).

Each of the mesh nodes 104, 106, 108, and 110 (and the mini-POP device 102) also includes multiple node-to-client consumption devices (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 via a first N2C wireless connection 111, a second client consumption device 114 via a second N2C wireless connection 111, and a third client consumption device 116 via a third N2C wireless connection 111. Client consumption devices can include TVs, mobile phones, streaming media players, PCs, Tablets, game consoles, and the like. The second node 106 wirelessly communicates with the client consumption devices via the second set of WLAN channels at a second frequency of approximately 2.4 GHz (e.g., 2.4 GHz band of the Wi-Fi® network technologies).

One or more of the mesh nodes 104, 106, 108, and 110 (and the mini-POP device 102) also includes a cellular connection 113 to wirelessly communicate control data between the respective node and a cloud device 118 hosting a mesh network control service 125 described below. The cellular connection 113 may be a low bandwidth, high availability connection to the Internet 117 provided by a cellular network 121. The cellular connection 113 may have a lower bandwidth than the point-to-point wireless connection 115. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The cloud device 118 may be one of a collection of devices organized as a cloud computing system that that hosts one or more services 120. Although cellular connection 113 may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like). As a result of cellular connection 113, or other external connection (e.g., Ethernet, Fiber, etc.), mesh node 110 and mini-POP device 102 can be considered gateway computing devices and/or root nodes. Other mesh nodes 104, 106, and 108 can communicate with the root nodes to access network resources external to the mesh network 100, such as CDN device 107, Internet 117, cloud device 118, datacenter 119, cellular network 121, or other external resources.

The services 120 may include a mesh network control service 125 and a mesh network management service (or system) 127. The services 120 may also include cloud services to control setup of and manage the mesh nodes, a gateway selection engine 140, as well as other cloud services. In one embodiment, gateway selection engine 140 is a subcomponent of the larger mesh network management service 127 which provides other functionality in addition to gateway selection. The mesh network control service 125 can be one or more cloud services. These cloud services can include a metric collector service, a health and status service, a link selection service, a channel selection service, a content request aggregation service, or the like. There may be APIs for each of these services. In one embodiment, gateway selection engine 140 performs operations related to gateway selection for the mesh nodes 104, 106, 108, and 110 (or the mini-POP device 102) in the mesh network 100. In one embodiment, gateway selection engine 140 causes the gateway nodes to send announcement messages with a particular frequency (i.e., with a fixed period between sent messages). After a particular gateway node has sent a threshold number of announcement messages, gateway selection engine 140 can direct the gateway node to reduce the frequency (i.e., increase the period between messages) in order to preserve network and device resources. In addition, gateway selection engine 140 can increase the frequency upon determining that there is only one gateway node, or a relatively small number of gateway nodes in the mesh network 100. Furthermore, upon detecting multiple gateway nodes flooding the network with announcement messages, gateway selection engine 140 can direct the gateway nodes to increase the interval between messages to avoid frequent gateway changes since the mesh nodes may not receive all of the announcement messages due to the congested network environment. In general, gateway nodes may send announcement messages in a broadcast format to all listening mesh nodes in the network 100. In one embodiment, however, gateway selection engine 140 can direct the gateway nodes to send the announcement messages in a unicast format directly to specific nodes in order to increase the reliability of the messages.

In one embodiment, gateway selection engine 140 can cause the gateway nodes to generate and send a special announcement message used to announce to the mesh nodes in the network that the gateway node is going to power down or otherwise be unavailable to serve in the gateway role. The special announcement message may be generated in response to a device condition (e.g., a battery level or signal strength of the backhaul link falling below a corresponding threshold. The special announcement message may include a first value (e.g., all 0's) for a type of backhaul connection in the announcement message and a second value (e.g., 0xffffffff) for a cost metric, wherein the presence of both the first value and the second value indicates to the mesh nodes that the gateway node is going to power down. During normal operation a gateway node sending an announcement message would have some type of backhaul connection which would be indicated, for example, by a logical value of "1" in a designated field of the announcement message. The description below with respect to FIG. 7B explains this indication in more detail. If the special announcement message has a first value (e.g., all 0's) for the type of backhaul connection, this would be unusual, as it would be expected that the gateway node has at least some type of backhaul connection. Accordingly, the presence of the first value (e.g., all 0's) serves as an indicator that the gateway node is going to power down.

In one embodiment, gateway selection engine 140 can be deployed in a centralized configuration in which the gateway selection engine 140 is deployed as a centralized controller, such as part of mesh network management service 127 or one of other services 120. Alternatively, in another embodiment, gateway selection engine 140 can run directly on mini-POP device 102 or mesh node 110 in mesh network 100. Additional details regarding the operations of gateway selection engine 140 are provided below with respect to FIGS. 3-7.

Although only four mesh nodes 104, 106, 108, and 110 are illustrated in FIG. 1, the mesh network 100 can use many mesh nodes, wirelessly connected together in a mesh network, to move content through the mesh network 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running client software (i.e., a media client). In one embodiment, the client software may be an application or other program designed to enable access to the CDN catalog and provide for playback video titles or other media items selected therefrom, in response to a request from a user. The 2.4 GHz WLAN channels are reserved for serving client consumption devices. The 2.4 GHz band may be chosen for serving media clients because there is a wider device adoption and support for this band. Additionally, the bandwidth requirements for serving client consumption devices will be lower than that of the network backbone. The number of media clients that each Meshbox node can support depends on a number of factors including memory, bandwidth requirements of the media client, incoming bandwidth that the Meshbox node can support, and the like. For example, the Meshbox nodes provide coverage to users who subscribe to the content delivery service and consume that service through the client consumption devices (e.g., a mobile phone, a set top box, a tablet, or the like). It should be noted that there is a 1-to-many relationship between Meshbox nodes and households (not just between nodes and media clients). This means the service can be provided without necessarily requiring a user to have a Meshbox node located in their house, as illustrated in FIG. 1. As illustrated, the second mesh node 106 services two client consumption devices 112, 114 located in a first house, as well as a third client consumption device 116 (e.g., a TV client) located in a second house. The Meshbox nodes can be located in various structures, and there can be multiple Meshbox nodes in a single structure.

The mesh network 100 may be used to address two main challenges: moving high bandwidth content to users and storing that content in the limited available storage of the mesh network itself. The first challenge may be addressed in hardware through the radio links between mesh nodes and the radio links between mesh nodes and client consumption devices, and in software by the routing protocols used to decide where to push traffic and link and channel management used to configure the mesh network 100. The second challenge may be addressed by borrowing from the existing content distribution strategy employed by the content delivery services using caches of content close to the user. The architecture to support content caching is known as a CDN. An example CDN implementation is the AWS CloudFront service. The AWS CloudFront service may include several point-of-presence (POP) racks that are co-located in datacenters that see a lot of user traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 may not have a wired or wireless network connection to the next level of cache (i.e., in CDN node 107). In another embodiment, the mini-POP device 102 may have a network connection (e.g., via the Internet) to the next level of cache, but this connection may not be a high-speed backhaul such as that used in a traditional data center. The following describes two different solutions for providing access to the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss. It should be noted that the mini-POP has a network connection that need not be an Internet connection to handle cache misses. These requests are forwarded to the CDNs. Alternatively, some mini-POP devices may not have network connections and do not handle cache misses as described herein.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections of the mesh network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The mesh network 100 can provide adequate bandwidth, especially node-to-node bandwidth. For video, content delivery services recommend a minimum of 900 Kbps for standard definition content and 3.5 Mbps for high definition content. It should be noted that the minimum requirement for 720 HD is 1.9 Mbps and a maximum is 3.5 Mbps. For some services to provide HD content, the 3.5 Mbps can be considered the minimum requirement. The mesh network 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the mesh network 100 via the point-to-point wireless connection 115 or the HITL process at the mini-POP device 102. Availability and impact on cost in terms of storage may be relevant factors in determining which content is to be injected into the mesh network 100 and which content is to remain in the mesh network 100. A challenge for traditional mesh network architectures is that this content is high bandwidth (in the case of video) and so the gateway nodes (e.g., mesh node 110 and mini-POP device 102) that connect the mesh to the larger Internet 117 must be also be high bandwidth. However, taking a closer look at the use case reveals that this content, although high bandwidth, does not need to be low latency. The embodiments of the mesh network 100 described herein can provide distribution of content that is high bandwidth, but in a manner that does not need low latency. Thus, popular content can reside closer to the client consumption devices of the mesh network 100 and reduce the latency normally associated with retrieving that content from the CDN.

In some embodiments, prior to consumption by a node having a media client itself or being wirelessly connected to a media client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the mesh network 100. The mesh network 100 can provide some fault tolerance so that a single mesh node becoming unavailable for failure or reboot has minimal impact on availability of content to other users. This means that a single mesh node is not the sole provider of a piece of content. The mesh network 100 can use reliability and availability mechanisms and techniques to determine where and how to store content in the mesh network 100.

The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified. Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, DRM, and node authentication.

Figure 2:
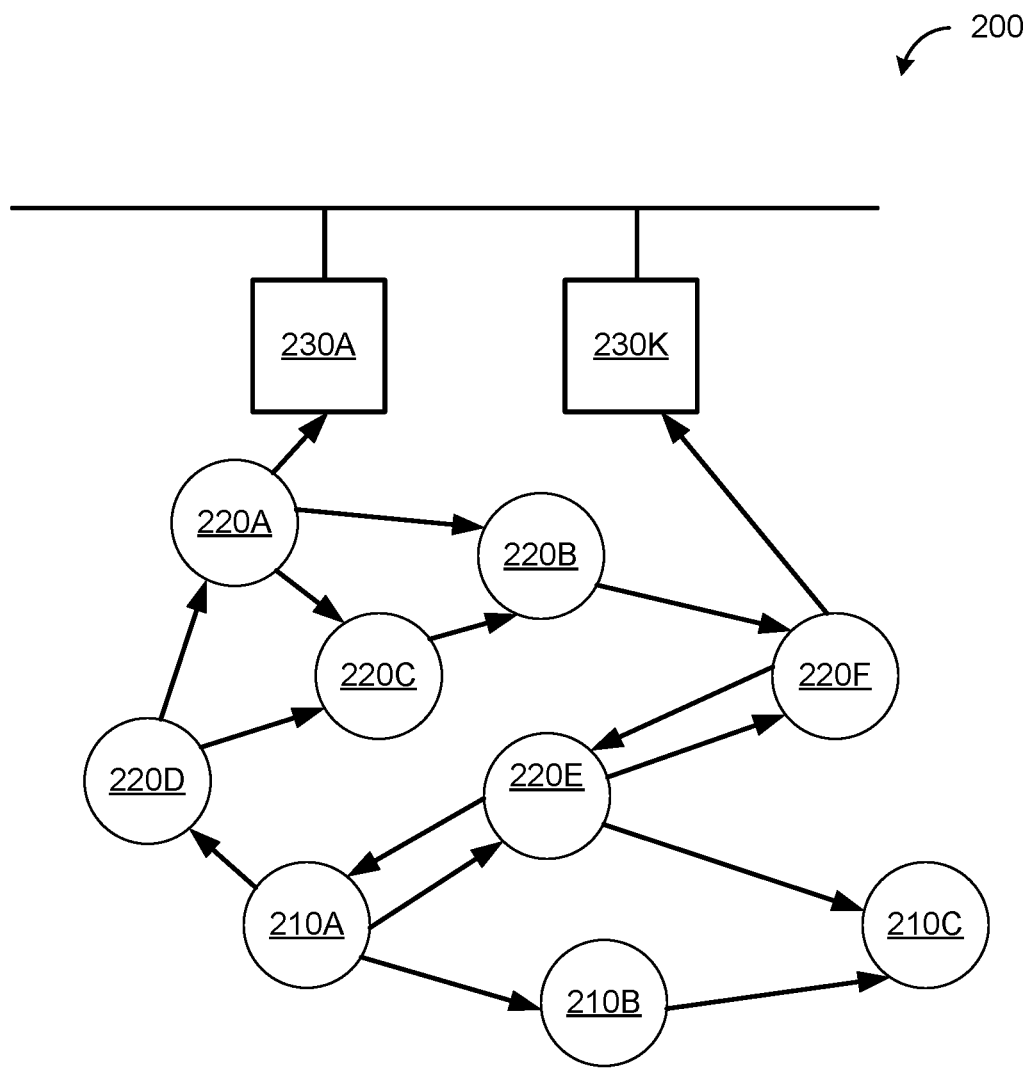
FIG. 2 is a functional network diagram of an illustrative example of a mesh network operating in accordance with embodiments of the present disclosure.

FIG. 2 is a functional network diagram of an illustrative example of a mesh network operating in accordance with embodiments of the present disclosure. In one embodiment, each of the network devices of mesh network 100 of FIG. 1 may implement functions of one or more functional components of FIG. 2. In other embodiments, various other mesh networks may include hardware and/or software components which may implement functions of one or more functional components of FIG. 2.

As schematically illustrated by FIG. 2, an example mesh network 200 may include a plurality of mesh network nodes including communication devices that implement the functions of wireless mesh point stations (MP STA) 210A-210C, mesh access points (MAP) 220A-220F, and mesh portals (MPP) 230A-230K. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a mesh network operating in accordance the embodiments of the present disclosure (e.g., mesh network 100 of FIG. 1). Discovering available mesh networks may be performed by passive or active scanning. In the passive scanning mode, the network device records the information from any beacon frames that have been received on one or more radio channels. Beacon frames are periodically transmitted by wireless access points in order to allow network devices to detect and identify the mesh network, as well as match communication parameters for determining whether to join the mesh network. In the active scanning mode, the network device may transmit, on each of one or more radio channels supported by the network device, probe request frames in order to solicit responses from available networks. An access point receiving a probe request may generate a probe response advertising the network parameters.

Figure 3:
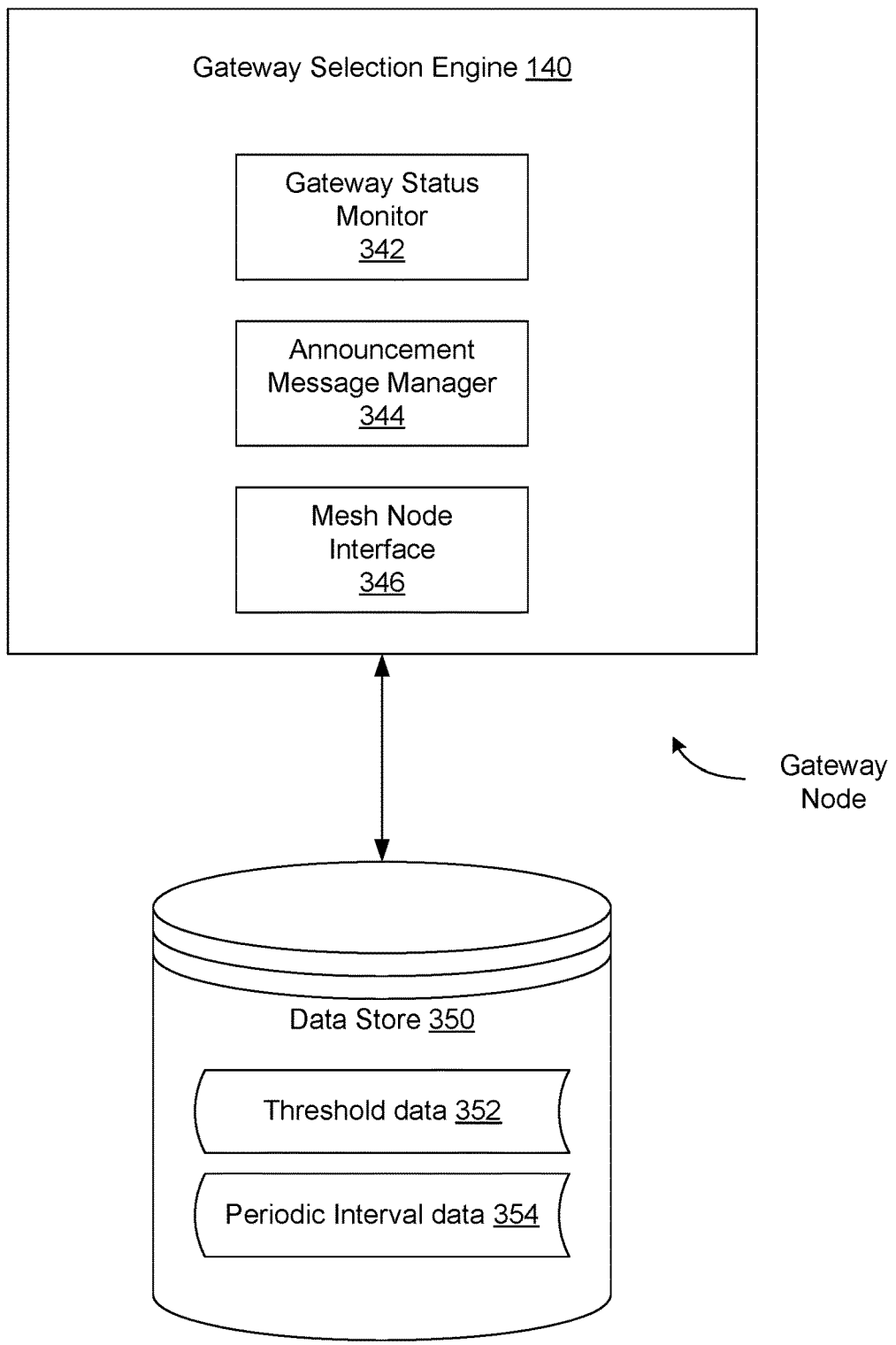
FIG. 3 is a block diagram illustrating a gateway selection engine that is included in a gateway node or in cloud services, according to an embodiment

FIG. 3 is a block diagram illustrating a gateway selection engine 140 that is included in a gateway node (e.g., mesh node 110 or mini-POP device 102) or in cloud services 120, according to an embodiment. In one embodiment, gateway selection engine 140 includes gateway status monitor 342, announcement message manager 344, and mesh node interface 346. This arrangement of modules and components may be a logical separation, and in other embodiments, these modules or other components can be combined together or separated in further components, according to a particular implementation. In one embodiment, data store 350 is connected to gateway selection engine 140 and includes threshold data 352 and periodic interval data 354. In one implementation, one physical node (e.g., a gateway node) may include both gateway selection engine 140 and data store 350. In another embodiment, data store 350 may be external to the physical node and may be connected over a network or other connection. In other implementations, the physical node and gateway selection engine 140 may include different and/or additional components and applications which are not shown to simplify the description. Data store 350 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, gateway status monitor 342 monitors one or more device conditions of the gateway node. These one or more device conditions can include any condition that may cause the gateway node to lose power or otherwise become unavailable to serve as a gateway node. Depending on the embodiment, these device conditions can include a battery level of the gateway node, a signal strength of the backhaul connection of the gateway node, or some other condition. In one embodiment, gateway status monitor 342 may receive an indication of the device condition from various subsystems of the device (e.g., a power controller, a network transceiver) and compare the device condition to a defined threshold. A battery threshold and a signal strength threshold may be stored in data stored 350 as part of threshold data 352. For example, if the battery level of the gateway node falls below a battery threshold amount (e.g., 10% of a full charge) or if the signal strength of the backhaul connection falls below a signal strength threshold (e.g., 20% of full strength), gateway status monitor 342 may determine that the device condition indicates that the gateway node is going to power down in a relatively short period of time. In response, gateway status monitor 342 may direct announcement message manager to generate a special announcement message to be sent to the other mesh nodes in the mesh network to indicate that this gateway node will soon no longer be available. In one embodiment, the special announcement message includes a first value for a type of backhaul connection and a second value for a cost metric, where the presence of both the first value and the second value indicates to the one or more receiving nodes that the gateway node is going to power down and that the receiving nodes should switch to a backup gateway node or start looking for a new gateway node. In addition, gateway status monitor 342 can detect when the gateway node is initially started, activated, or booted-up or when the gateway node is restarted, reactivated, or rebooted after some period of non-operation (e.g., after recovering from a power loss event).

In one embodiment, announcement message manager 344 generates Root Node Announcement (RANN) information elements for the gateway node. The RANN elements include an identifier of the gateway node itself, a first indication of a type of backhaul connection between the gateway node and one or more network resources external to the mesh network and a second indication of a cost metric defining a cost associated with utilizing the gateway node computing device to access the one or more network resources for each of one or more mesh nodes in the mesh network since the mesh nodes do not have direct access to the one or more network resources. In addition, the RANN elements may include other information, as described below with respect to FIGS. 7A-7C. In another embodiment, announcement message manager 344 instead generates Gateway Announcement (GANN) information elements, which include similar data to the RANN elements. The RANN or GANN elements are included in an announcement message to be sent out by the gateway node and which serves as an indication to the one or more nodes in the mesh network that the gateway node is available to provide access to network resources external to the mesh network.

In one embodiment, mesh node interface 346 sends the announcement messages generated by announcement message manager 344 to other mesh nodes, such as nodes 104, 106, and 108 in the mesh network 100. Depending on the embodiment, mesh node interface 346 can sent the announcement messages in either a broadcast format to all of the mesh nodes in the mesh network or in a unicast format to certain neighboring nodes separately. In one embodiment, mesh node interface 346 sends the announcement messages at periodic intervals. The length of the intervals may vary depending on certain conditions and may be defined in periodic interval data 354. For example, mesh node interface 346 may send the announcement messages with a first frequency upon start-up or re-start of the gateway node. Mesh node interface 346 may keep track of how many announcement messages have been sent, such as by incrementing or decrementing a counter (not shown) or by some other means. After the number of announcement messages sent reaches a threshold amount (e.g., a threshold defined in threshold data 352), mesh node interface 346 may send the announcement messages with a second frequency. In one embodiment, the threshold number of announcement messages is proportional to a number of nodes in the mesh network, such that if there are fewer nodes the threshold is relatively low, while if there are more nodes the threshold is relatively high. This second frequency may be lower, such that a period of time that passes between the sending of messages is longer than when messages were being sent at the first frequency. In one embodiment, the second periodic interval is proportional to a number of gateway nodes sending announcement messages in the mesh network, such that if there are more gateway nodes the interval can be relatively longer and if there are fewer gateway nodes the interval can be relatively shorter.

In one embodiment, gateway selection engine 140 receives an indication when a mesh node, such as node 104, 106, or 108 successfully connects to the gateway, such as mesh node 110 or mini-POP device 102. For example, upon successful connection, the mesh nodes 104, 106, or 108 may start sending update messages to the cloud services 140. In one embodiment, gateway selection engine 140 can determine that all mesh nodes have connectivity with at least one gateway by running an algorithm (e.g., "union-find") on the received update messages from the mesh nodes. Upon learning that all mesh nodes in the wireless mesh network 100 are connected to at least one gateway node, gateway selection engine 140 can send an event message to announcement message manager 344 causing it to lower the frequency at which the announcement messages are being sent. Since all of the mesh nodes are known to currently be connected to a gateway node, and thus have access to the external network resources, the frequency with which the announcement messages are sent can be reduced since a gateway node is less likely to need to switch to a new or different gateway.

Figure 4:
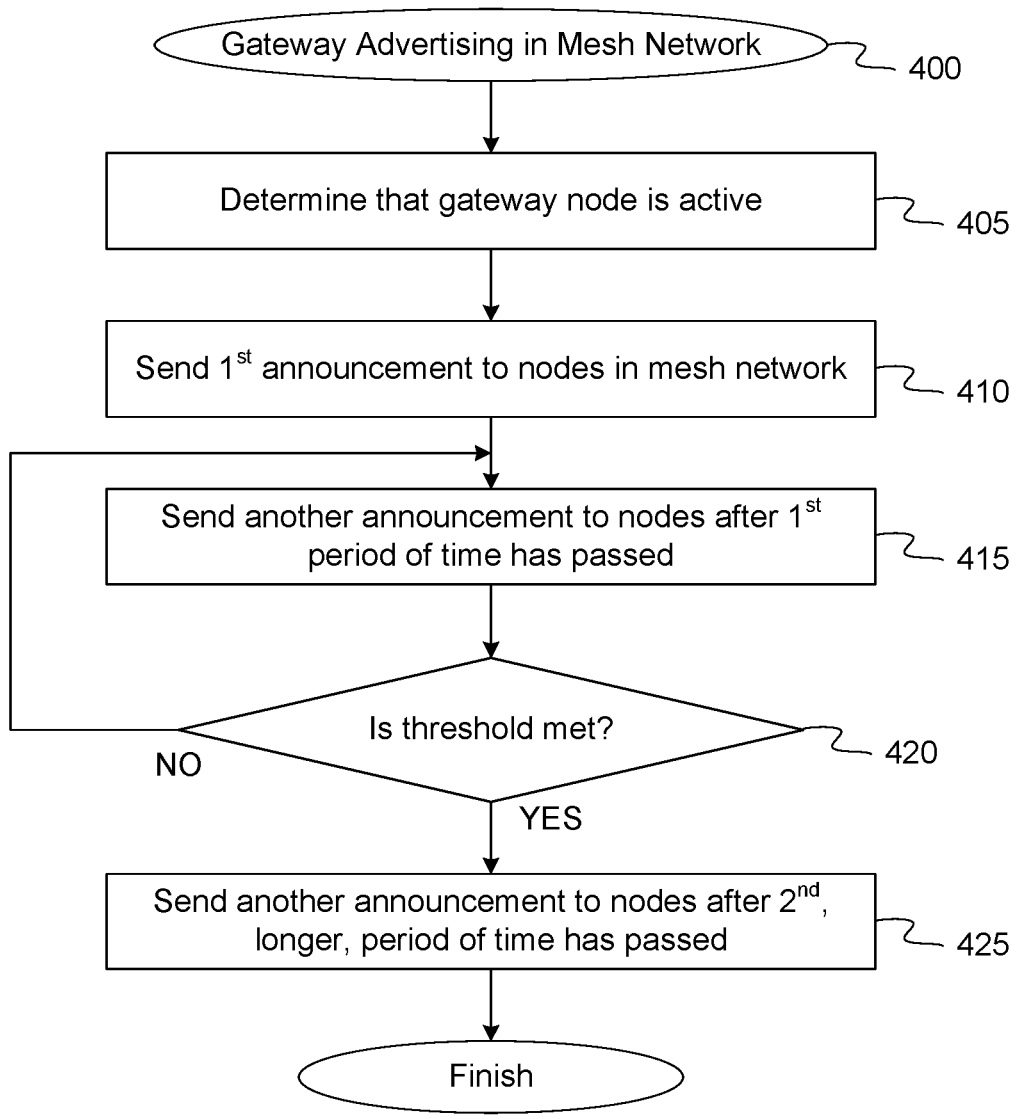
FIG. 4 is a flow diagram illustrating method of gateway advertising in a mesh network, according to an embodiment.

FIG. 4 is a flow diagram illustrating method of gateway advertising in a mesh network, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by gateway selection engine 140, within mesh node 110, mini-POP device 102, or cloud services 120, as shown in FIG. 1.

Referring to FIG. 4, at block 405, method 400 determines that the gateway node is active. For example, in one embodiment, gateway status monitor 342 detects a power-on event after some period of non-operation (e.g., a restart of the gateway node). In other embodiments, gateway status monitor 342 determines that the gateway node has recovered from a power loss event and has been restarted, reactivated, or rebooted.

At block 410, method 400 sends a first announcement message to one or more nodes in the mesh network. In one embodiment, the first announcement message comprises an indication to the one or more nodes in the mesh network that the gateway node has access to network resources external to the mesh network. In one embodiment, the first announcement message further comprises an indication of a type of backhaul connection between the gateway node and the network resources external to the mesh network and an indication of a metric defining a cost associated with utilizing the gateway node for each of the one or more nodes in the mesh network. In one embodiment, the first announcement message further comprises at least one of a GANN information element or a RANN information element. In one embodiment, gateway node sends the first announcement message in a broadcast format to the one or more nodes in the mesh network. In another embodiment, gateway node sends the first announcement message in a unicast format to the one or more nodes in the mesh network separately.

At block 415, method 400 sends another announcement message to the one or more nodes in the mesh network after a first period of time has passed since a previous announcement message was sent. In one embodiment, mesh node interface 346 periodically sends the announcement messages at intervals defined in periodic interval data 354. Upon restart of the gateway node, mesh node interface 346 may send the announcement messages at a relatively high frequency with a lower period of time passing between the sending of the announcement messages.

At block 420, method 400 determines whether a threshold number of announcement messages have been sent by the gateway node. In one embodiment, mesh node interface 346 tracks the number of announcement messages that have been sent and compares them to a threshold in threshold data 352. In one embodiment, the threshold number of announcement messages is proportional to a number of nodes in the mesh network. If the threshold number of announcement messages has not been sent, method 400 returns to block 415 and continues sending announcement message after a first period of time has passed.

If the threshold number of announcement messages have been sent, at block 425, method 400 sends a third announcement message to the one or more nodes in the mesh network after a second period of time has passed since a previous announcement message was sent, wherein the second period of time is longer than the first period of time. In one embodiment, the second period of time is proportional to a number of gateway nodes sending announcement messages in the mesh network. In the example given herein, the threshold number of messages is two, such that two messages are sent at the first frequency and the third messages is sent at the second, lower frequency. It should be understood, however, that in practice the threshold may be set at any different amount (e.g., 10, 20, 50, 100, 500, etc.) and that there may be multiple threshold that each trigger a different frequency change. For example, the first 50 announcement messages may be sent with a first frequency, the next 100 messages may be sent with a second frequency, and any messages sent thereafter may be sent with a third frequency.

Figure 5:
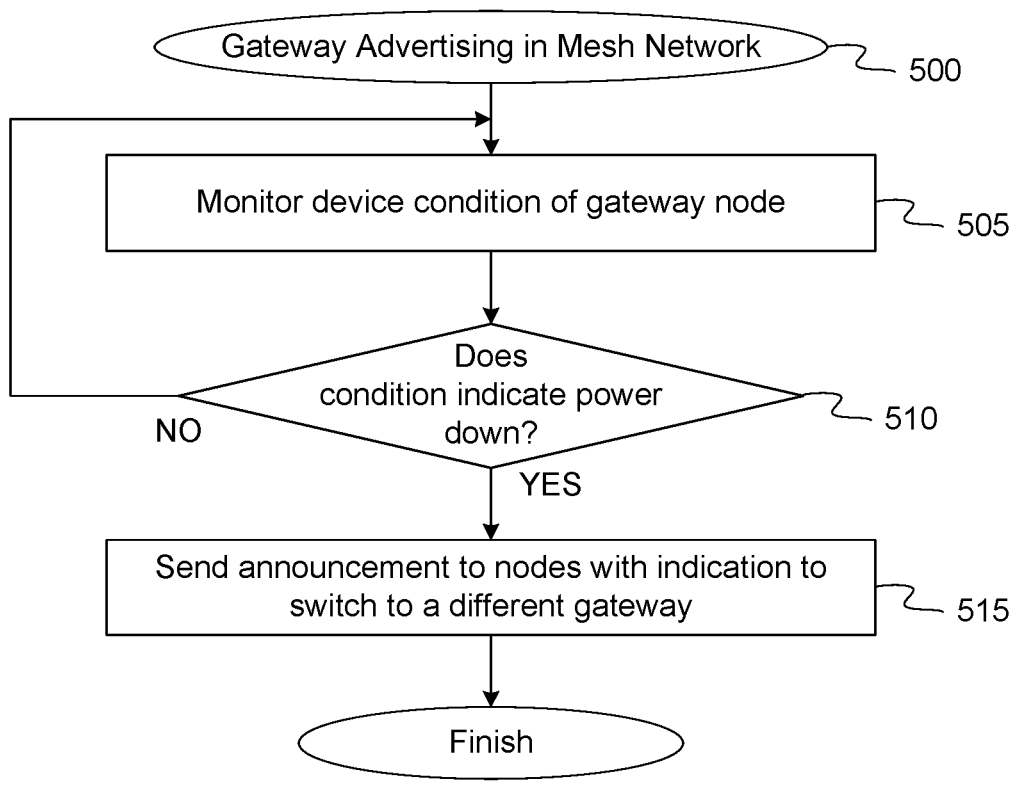
FIG. 5 is a flow diagram illustrating method of gateway advertising in a mesh network, according to an embodiment.

FIG. 5 is a flow diagram illustrating method of gateway advertising in a mesh network, according to an embodiment. The method 500 may be performed by processing logic that comprises hardware (e.g., circuitry, dedicated logic, programmable logic, microcode, etc.), software, firmware, or a combination thereof. In one embodiment, method 500 may be performed by gateway selection engine 140, within mesh node 110, mini-POP device 102, or cloud services 120, as shown in FIG. 1.

Referring to FIG. 5, at block 505, method 500 monitors a device condition of the gateway node. At block 510, method 500 determines whether the device condition indicates that the gateway is going to power down. In one embodiment, gateway status monitor 342 determines whether at least one of a battery level of the gateway node is below a battery threshold amount or a signal strength of a backhaul connection of the gateway node is below a signal strength threshold amount.

At block 515, method 500 sends a special announcement message to the one or more nodes in the mesh network, the special announcement message comprising an indication to cause the one or more nodes to switch to a different gateway in the mesh network. In one embodiment, the indication in the fourth announcement message comprises a first value for a type of backhaul connection and a second value for a cost metric, wherein the presence of both the first value and the second value indicates to the one or more nodes that the gateway is going to power down. This indication can allow the mesh nodes to either switch to a backup gateway node or to begin listening for announcements from a different gateway node so that they can preemptively switch before the current gateway node powers down in order to prevent a service interruption.

Figure 6:
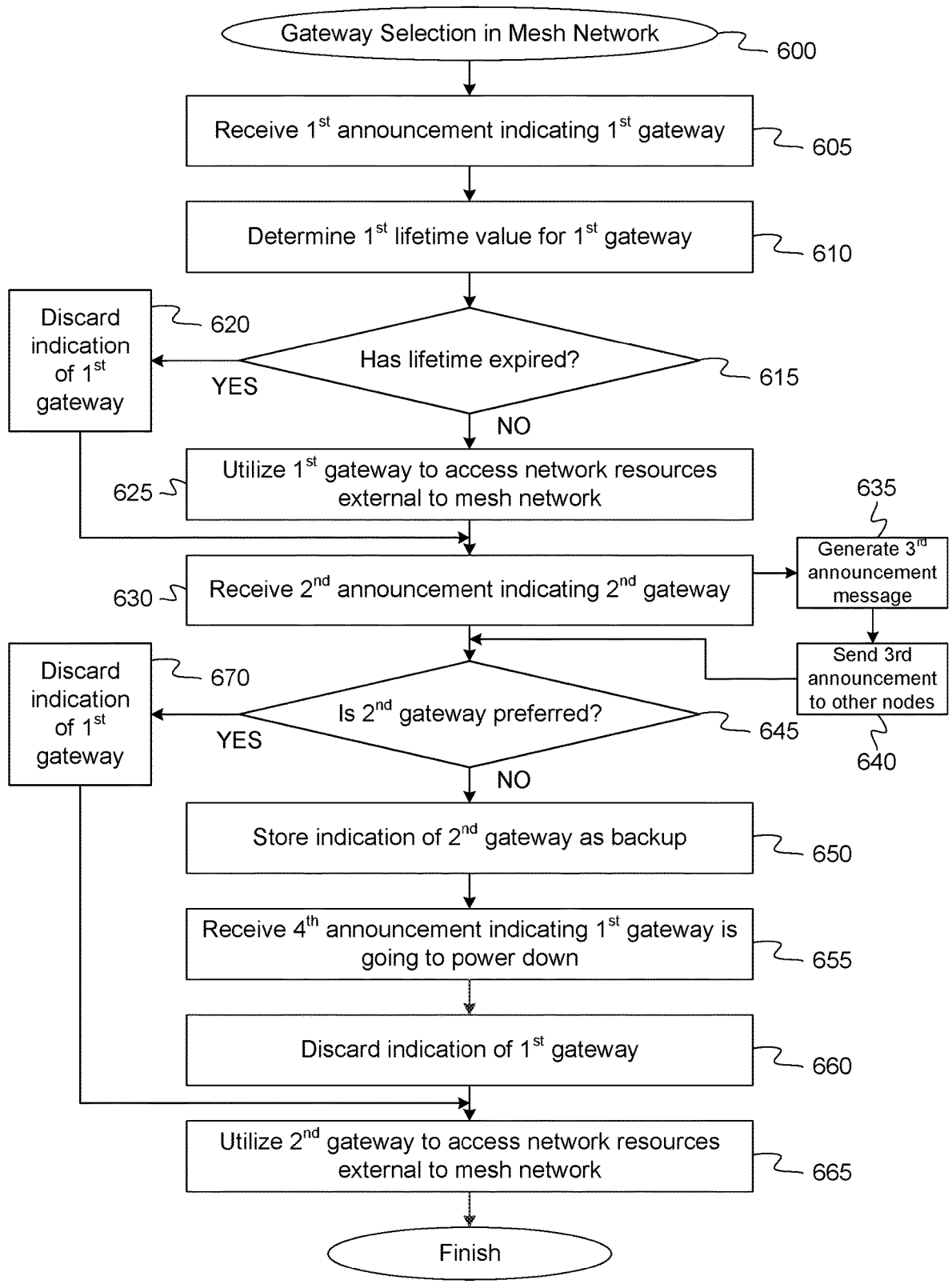
FIG. 6 is a flow diagram illustrating method of gateway selection in a mesh network, according to an embodiment.

FIG. 6 is a flow diagram illustrating method of gateway selection in a mesh network, according to an embodiment. The method 600 may be performed by processing logic that comprises hardware (e.g., circuitry, dedicated logic, programmable logic, microcode, etc.), software, firmware, or a combination thereof. In one embodiment, method 600 may be performed by logic on one of mesh nodes 104, 106, or 108, as shown in FIG. 1.

Referring to FIG. 6, at block 605, method 600 receives a first announcement message from another node in the mesh network, the first announcement message comprising an identifier of a first gateway node in the mesh network from which the first announcement message originated and an indication of how far the first mesh node is from the first gateway node. The first announcement message further comprises at least one of a GANN information element or a RANN information element, and wherein the first announcement message comprises an indication of a type of backhaul connection between the first gateway node and the network resources external to the mesh network and an indication of a cost metric defining a cost to the first mesh node associated with utilizing the first gateway node.

At block 610, method 600 determines a lifetime value indicating for how long the first mesh node can use the first gateway node to access network resources external to the mesh network. In one embodiment, the lifetime value is based on how far the first mesh node is from the first gateway node. This distance may be measured by a hop count (indicating how many intermediate nodes are between the first mesh node and the first gateway node) stored in the RANN information element. In one embodiment, the announcement message is passed from node to node in the mesh network with each intermediate node updating the hop count value. In one embodiment, the lifetime value increases in response to an increase in how far the first mesh node is from the first gateway. Thus, a node that is farther (i.e. more hops) away from the gateway node may have a higher lifetime value, and thus may keep the gateway node information for longer, than a node that is closer (i.e., less hops)

to the gateway node since it is more difficult for the farther node to hear new announcement messages due to packet drops, collisions, etc.

At block 615, method 600 determines whether the lifetime value has expired. In one embodiment, each of mesh nodes 104, 106, 108 maintains a timer, a counter, or some other mechanism to track the expiration of the lifetime value. If the lifetime value has expired, at block 620, method 600 discards the identifier of the first gateway node and no longer uses the first gateway node to access the external network resources. In another embodiment, method 600 maintains the identifier of the first gateway but still communicably couples to a different gateway. If the lifetime value has not expired, however, at block 625, method 600 continues to utilize the first gateway node to access the network resources external to the mesh network until the lifetime value expires or until some other event occurs, as described below.

At block 630, method 600 receives a second announcement message from another node in the mesh network, the second announcement message comprising an identifier of a second gateway node in the mesh network from which the second announcement message originated and an indication of how far the first mesh node is from the second gateway node. In one embodiment, the identifier is a media access control (MAC) address, or some other unique identifier, and the indication of how far is the hop count described above.

At block 635, method 600 optionally modifies the first announcement message to generate a third announcement message, the third announcement message comprising the identifiers of the first gateway and of the second gateway. In one embodiment, the mesh node can add identifiers (e.g., MAC addresses) of all of the gateway nodes from which it has received announcement messages since it began using the current gateway node to the announcement message. An example of how the root address field of the RANN element is modified to include these identifier is shown in FIG. 7C. At block 640, method 600 optionally sends the third announcement message to another mesh node in the mesh network. For example, the mesh node may forward the modified announcement message on to other neighboring nodes in its transmission path.

At block 645, method 600 determines whether the second gateway is preferred over the first gateway by comparing the type of backhaul connection and the cost metric of the first gateway node to a type of backhaul connection and a cost metric of the second gateway node. In one embodiment, certain types of backhaul connections may be preferred, such as Ethernet/Fiber over a cellular backhaul, and a mesh node may prioritize a gateway having the Ethernet/Fiber backhaul connection over a gateway having a cellular backhaul connection. In another embodiment, gateways with multiple backhaul connections may be preferred over gateways with a single backhaul connection. In one embodiment, the cost metric represents the overall cost for a mesh node to use the corresponding gateway. The cost metric may include a value that reflects the distance between the gateway and the mesh node, the type of backhaul connection that the gateway has, an amount of resources (e.g., power, bandwidth) consumed when utilizing the gateway, and potentially other factors. In general a gateway with a lower cost metric may be preferred over a gateway with a higher cost metric.

If the second gateway is not preferred, at block 650, method 600 stores the identifier of the second gateway node as a back-up gateway for the first mesh node. In one embodiment, each mesh node has the storage capacity to store both primary gateway information and secondary gateway information. The primary gateway information may include information from the RANN information element received from the gateway node which the mesh node is currently using. The secondary information may include information from a RANN information element received from a different gateway node and which is stored as a back-up to be used in the event that the primary gateway node becomes unavailable. The storage of the secondary gateway information allows the mesh node to switch to the back-up gateway more quickly and without the mesh node having to wait to find a new gateway node. In other embodiments, subject to the memory availability on the mesh node, there may be some number N (e.g., more than two) of gateway information identifiers stored on the mesh node. The N entries may be ranked according to preference such that when the first gateway information expires or is otherwise removed, the gateway associated with the next entry can be used. By storing multiple gateway information identifiers, the node ensures that a usable gateway is available, even if multiple gateways are lost.

At block 655, method 600 receives a fourth announcement message from another node in the mesh network, the fourth announcement message comprising an identifier of the first gateway node in the mesh network from which the fourth announcement message originated. In one embodiment, this fourth announcement message may be a special announcement message indicating that the first gateway node is going to power down. For example, the fourth announcement message may include a first value for a type of backhaul connection (e.g., 0) and a second value for a cost metric (e.g., 0xffffffff), wherein the presence of the first value and the second value indicates to the first mesh node that the first gateway node is going to power down. Upon receiving the special announcement message, at block 660, method 600 discards the identifier of the first gateway node, and at block 665, method 600 begins utilizing the second gateway node to access the network resources external to the mesh network. In another embodiment, method 600 maintains the identifier of the first gateway but still communicably couples to a different gateway.

If method 600 determines that the second gateway is not preferred at block 645, at block 670, method 600 either discards the identifier of the first gateway or stores the identifier of the first gateway node as a back-up gateway for the first mesh node and utilizes the second gateway node to access the network resources external to the mesh network, at block 665.

FIG. 7A is a block diagram illustrating a Root Node Announcement (RANN) information element 700, according to an embodiment. RANN 700 may be representative of the RANN information element included in an announcement message sent by a gateway node, such as mesh node 110 or mini-POP device 102, in mesh network 100. In one embodiment, RANN 700 includes a number of fields such as Element ID field 701 (1 byte), Length field 702 (1 byte), Flags field 703 (1 byte), Hop Count field 704 (1 byte), Element Time to Live (TTL) field 705 (1 byte), Root Address field 706 (6 bytes), Sequence Number field 707 (4 bytes), Interval field 708 (4 bytes), and Metric field 709 (4 bytes). Element ID field 701 includes a unique identifier of the RANN 700. Length field 702 includes a value representing a total length of the RANN 700. Flags field 703 may be used to express the type of backhaul connection used by the sending gateway, as described further below with respect to FIG. 7B. Hop Count field 704 includes a value representing a number of hops between the sending gateway node and the receiving mesh node. Element TTL field 705 includes a value representing a remaining number of times that the RANN 700 may be forwarded. Root Address field 706 includes an identifier, such as a MAC address, of the sending gateway node, as described further below with respect to FIG. 7C. Sequence Number field 707 includes a sequence number value specific to the sending gateway node. Interval field 708 includes a value representing a period of time after which the receiving mesh node should expect to receive another RANN element 700. Metric field 709 includes a value representing the cost of using the sending gateway node. In one embodiment, the value in metric field 709 is a quasi-Boolean value in that it is either some non-zero, but still low value, indicating that the cost to the receiving node of using the sending gateway node to access external network resources is relatively low, or some other much higher value, indicating that the cost is relatively high. The type of backhaul connection, capacity, and signal strength (in the case of a cellular connection), as well as the number of hops between the mesh node and the gateway may be factors that influence whether the value in metric field 709 is low or high. Thus, the single value in metric field 709 may be representative of both the cost of the backhaul connection as well as the cost of the mesh path from the mesh node to the gateway node, such that existing protocol format can still be used.

FIG. 7B is a block diagram illustrating a modified Flags field 703 of a RANN information element 700, according to an embodiment. In one embodiment, certain bits of the Flags field 703 can be used to store an indication of a type of backhaul connection used by the sending gateway node. For example, Bit 0 may be used as a Gate Announcement field including an indication that the gateway node sending the RANN information element 700 has network connectivity, Bits 1-3 may be reserved, while Bits 4-7 may be set to a particular logic value (e.g., "1") if the sending gateway node has a corresponding type of backhaul connection. In one embodiment, Bit 4 represents a cellular connection, Bit 5 represents a Wi-Fi connection, Bit 6 represents a Fiber/Ethernet connection, and Bit 7 represents some other type of connection. In other embodiments, different bits of Flags field 703 may be used to represent the different types of backhaul connections.

FIG. 7C is a block diagram illustrating a modified Root Address field 706 of RANN information element 700, according to an embodiment. In one embodiment, each mesh node can include the MAC addresses of the other RANNs it received during the last intervals in the Root Address field 706 and propagate RANN 700 to other nodes in the network. This helps receiving node decide whether RANN originators are alive or not when RANNs are lost for some reason. In one embodiment, a node may increase the lifetime upon finding the current gateway's MAC address either as RANN originator address or contained as part of the MAC address list in the RANN 700 In one embodiment, Byte 0 in Root Address field 706 is reserved, Byte 1 stores a value N representing the number of MAC addresses present in the list, and Bytes 2-5 can store the various MAC addresses of other RANN originators. In another embodiment, there may be an additional data element transmitted by the gateway node, such as a vendor element that is separate from the RANN information element 700, which includes the MAC addresses of the other RANN originators. The vendor element may be part of the same frame in which the RANN information element 700 is transmitted, but may include the MAC addresses instead of including them in the Root Address field 706.

Figure 8:
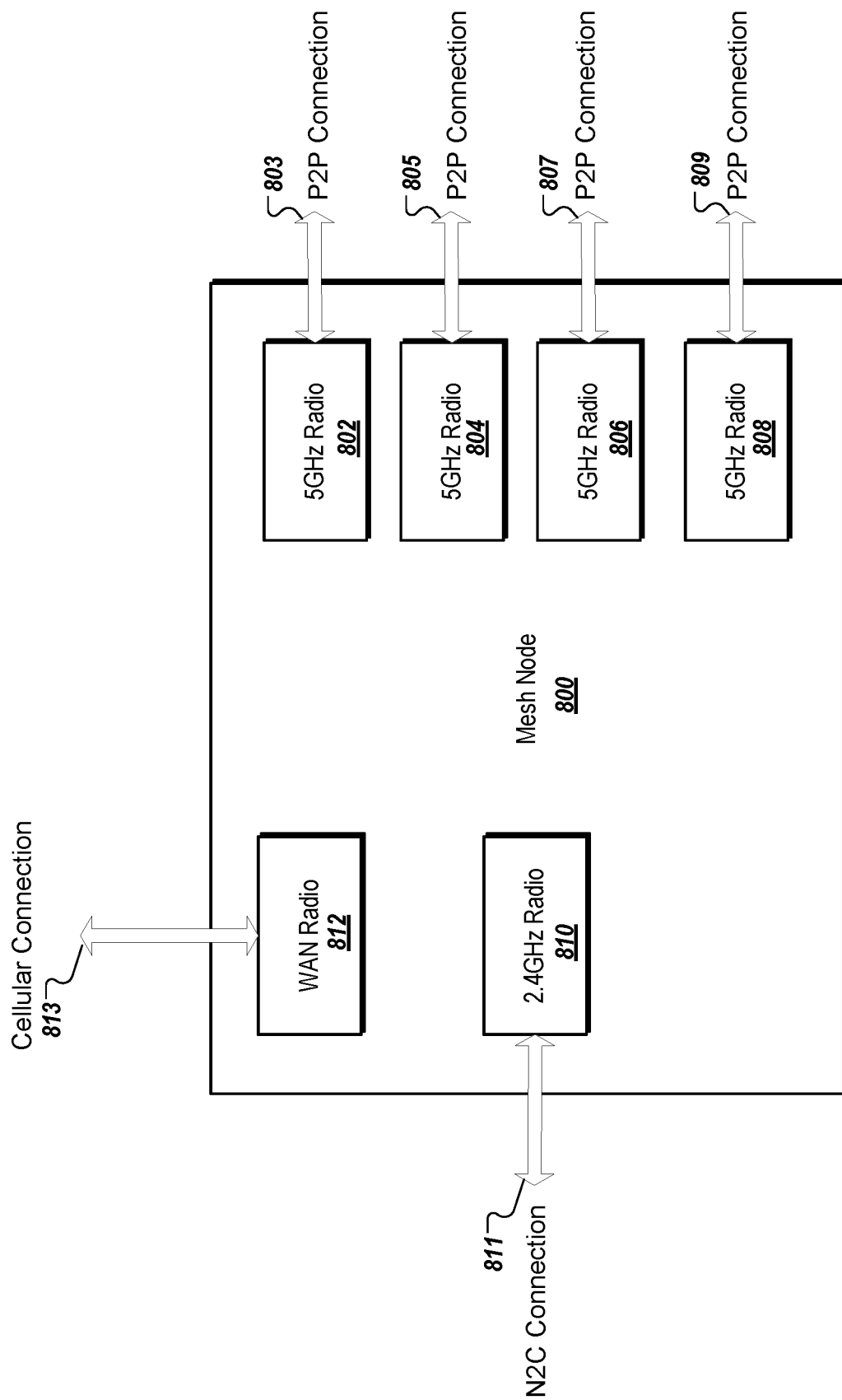
FIG. 8 is a block diagram of a mesh node with multiple radios according to one embodiment.

FIG. 8 is a block diagram of a mesh node 800 with multiple radios according to one embodiment. The mesh node 800 includes a first 5 GHz radio 802, a second 5 GHz radio 804, a third 5 GHz radio 806, a fourth 5 GHz radio 808, a 2.4 GHz radio 810, and a cellular radio 812. The first 5 GHz radio 802 creates a first P2P wireless connection 803 between the mesh node 800 and another mesh node (not illustrated) in a mesh network. The second 5 GHz radio 804 creates a second P2P wireless connection 805 between the mesh node 800 and another mesh node (not illustrated) in the mesh network. The third 5 GHz radio 806 creates a third P2P wireless connection 807 between the mesh node 800 and another mesh node (not illustrated) in the mesh network. The fourth 5 GHz radio 808 creates a fourth P2P wireless connection 809 between the mesh node 800 and another mesh node (not illustrated) in the mesh network. The 2.4 GHz radio 810 creates a N2C wireless connection 811 between the mesh node 800 and a client consumption device (not illustrated) in the mesh network. The N2C wireless connection may be one of a second set of one or more WLAN connections that operate at a second frequency of approximately 2.4 GHz. The cellular radio 812 creates a cellular connection between the mesh node 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 800 may be any one of the mesh network device described herein. In one embodiment, the mesh node 800 may be an ingress node or a mini-POP node that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 800 may receive a first request for a first content file from the first client consumption device over the first N2C connection 811. The mesh node 800 sends a second request for the first content file to a second network hardware device through the network backbone via a first set of zero or more intervening network hardware devices between the first network hardware device and the second network hardware device. The mesh node 800 receives the first content file through the network backbone via the first set of zero or more intervening network hardware devices and sends the first content file to the first client consumption device over the first N2C connection 811. In a further embodiment, the mesh node 800 includes the WAN radio 812 to wirelessly connect to a MNCS device by a cellular connection 813 to exchange control data.

In some embodiments, a path between the mesh node 800 and an ingress node (or any other mesh network device) could include zero or more hops of intervening network hardware devices. In some cases, the path may include up to 12-15 hops within a mesh network of 100×100 network hardware devices deployed in the mesh network. In some embodiments, a number of network hardware devices in the mesh network is greater than fifty. The mesh network may include hundreds, thousands, and even tens of thousands of network hardware devices.

In some embodiments, the mesh node 800 includes memory to store content files, control and command data, as well as the aggregate data described herein. The memory of the first network hardware device may be volatile memory, non-volatile memory, or a combination of both. When a content file is not stored in the memory or the storage of the mesh node 800, the mesh node 800 generates and sends a request to another node in the mesh network. Intervening network hardware devices can make similar determinations to locate the content file in the mesh network. In the event that the first content file is not stored in the mesh network, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 803, 805, 807, 809 are WLAN connections that operate in a first frequency range and the N2C connections 811 are WLAN connections that operate in a second frequency range. In another embodiment, the P2P wireless connections 803, 805, 807, 809 operate at a first frequency of approximately 5.0 GHz and the N2C connections 811 operate at a second frequency of approximately 2.4 GHz.

Figure 9:
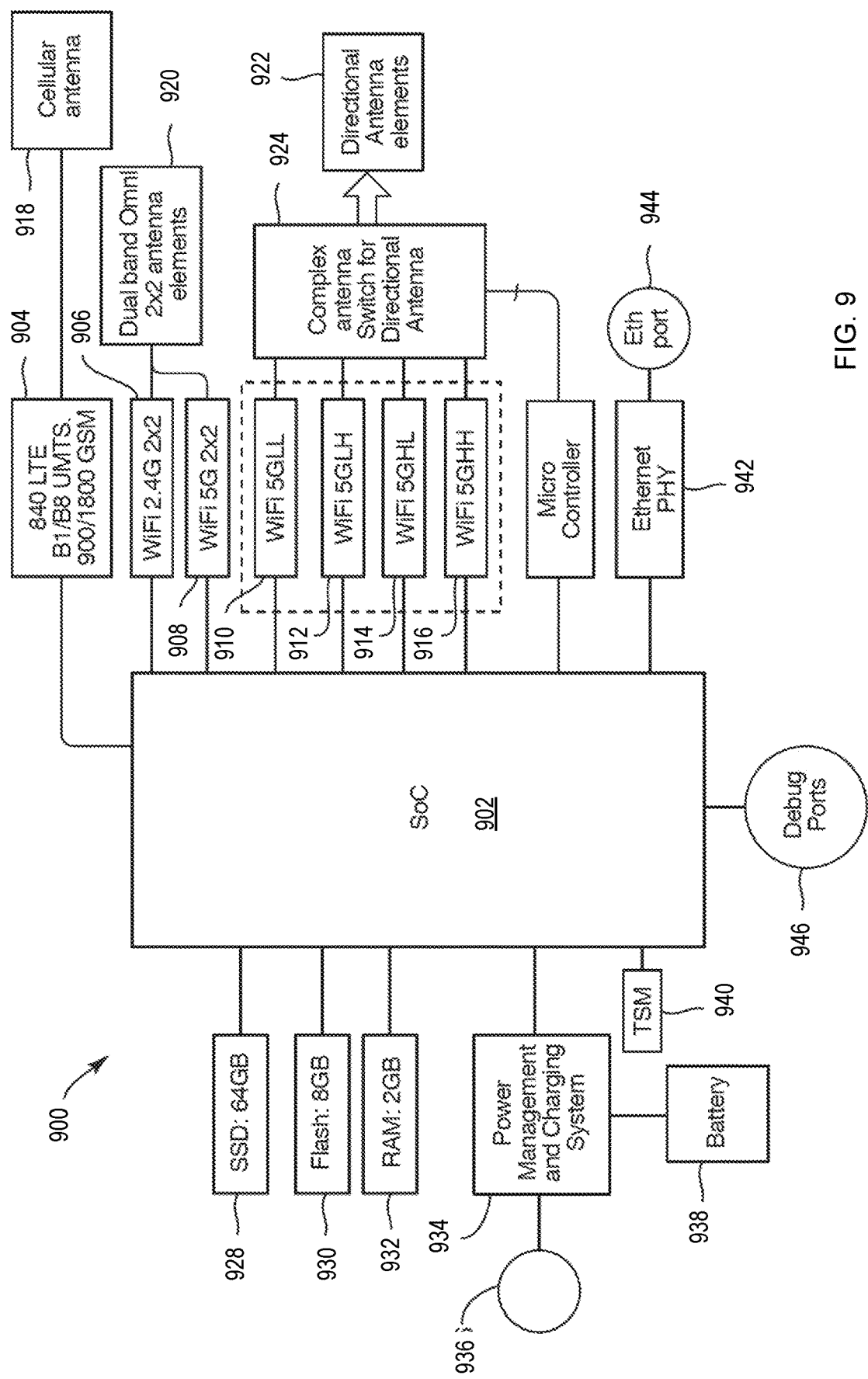
FIG. 9 is a block diagram of a mesh network device according to one embodiment.

FIG. 9 is a block diagram of a mesh network device 900 according to one embodiment. The mesh network device 900 may be one of many mesh network devices organized in a mesh network (e.g., mesh network 100). The mesh network device 900 is one of the nodes in a mesh topology in which the mesh network device 900 cooperates with other mesh network devices in distribution of content files to client consumption devices in an environment of limited connectivity to broadband Internet infrastructure, as described herein. The mesh network device 900 may be the mini-POP node 102 of FIG. 1. Alternatively, the mesh network device 900 may be any one of the mesh network devices 102, 104, 106, 108, and 110 of FIG. 1. In another embodiment, the mesh network device 900 is any one of the network hardware devices 210-230 of FIG. 2.

The mesh network device 900 includes a system on chip (SoC) 902 to process data signals in connection with communicating with other mesh network devices and client consumption devices in the mesh network. The SoC 902 includes a processing element (e.g., a processor core, a central processing unit, or multiple cores) that processes the data signals and controls the radios to communicate with other devices in the mesh network. In one embodiment, the SoC 902 is a dual core SoC, such as the ARM A15 1.5 GHz with hardware network acceleration. The SoC 902 may include memory and storage, such as 2 GB DDR RAM and 64 GB eMMC coupled to the SoC 902 via external HDD interfaces (e.g., SATA, USB3, or the like). The SoC 902 can implement processing logic comprising software, firmware, hardware, or any combination thereof. The SoC 902 may include multiple RF interfaces, such as a first interface to the first RF module 904 (e.g., HSCI interface for cellular module (3G)), a second interface to the WLAN 2.4 GHz radio 906, a third interface to the WLAN 2.4 GHz radio 908, and multiple interfaces to the WLAN 5 GHz radios, such as on a PCIe bus. In one embodiment, the SoC 902 is the IPQ8064 Qualcomm SoC or the IPQ4029 Qualcomm SoC. Alternatively, other types of SoCs may be used, such as the Annapurna SoC, or the like. Alternatively, the mesh network device 900 may include an application processor that is not necessarily considered to be a SoC.

The mesh network device 900 may also include memory and storage. For example, the mesh network device 900 may include SSD 64 GB 928, 8 GB Flash 930, and 2 GB 932. The memory and storage may be coupled to the SoC 902 via one or more interfaces, such as USB 3.0, SATA, or SD interfaces. The mesh network device 900 may also include a single Ethernet port 944 that is an ingress port for Internet Protocol (IP) connection. The Ethernet port 944 is connected to the Ethernet PHY 942, which is connected to the SoC 902. The Ethernet port 944 can be used to service the mesh network device 900. Although the Ethernet port 944 could provide wired connections to client consumption devices, the primary purpose of the Ethernet port 944 is not to connect to client consumption devices, since the 2.4 GHz connections are used to connect to client consumption devices in the mesh network. The mesh network device 900 may also include one or more debug ports 946, which are coupled to the SoC 902. The memory and storage may be used to cache content, as well as store software, firmware or other data for the mesh network device 900.

The mesh network device 900 may also include a power curation and charging system 934. The power management and charging system 934 can be connected to a power supply 936 (e.g., 240V outlet, 120V outlet, or the like). The power management and charging system 934 can also connect to a battery 938. The battery 938 can provide power in the event of power loss. The power management and charging system 934 can be configured to send a SoS message on power outage and backup system state. For example, the WLAN radios can be powered down, but the cellular radio can be powered by the battery 938 to send the SoS message. The battery 938 can provide limited operations by the mesh network device 900, such as for 10 minutes before the entire system is completely powered down. In some cases, power outage will likely affect a geographic area in which the mesh network device 900 is deployed (e.g., power outage that is a neighborhood wide phenomenon). The best option may be to power down the mesh network device 900 and let the cloud service (e.g., back end service) know of the outage in the mesh network. The power management and charging system 934 may provide a 15V power supply up to 21 watts to the SoC 902. Alternatively, the mesh network device 900 may include more or less components to operate the multiple antennas as described herein.

The mesh network device 900 includes a first radio frequency (RF) module 904 coupled between the SoC 902 and a cellular antenna 918. The first RF module 904 supports cellular connectivity using the cellular antenna 918. In one embodiment, the cellular antenna 918 includes a primary wide area network (WAN) antenna element and a secondary WAN antenna element. The first RF module 904 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, metadata download, or the like. Alternatively, the first RF module 904 may support other bands, as well as other cellular technologies. The mesh network device 900 may include a GPS antenna and corresponding GPS module to track the location of the mesh network device 900, such as moves between homes. However, the mesh network device 900 is intended to be located inside a structure, the GPS antenna and module may not be used in some embodiments.

The mesh network device 900 includes a first set of wireless local area network (WLAN) modules 906, 908 coupled between the SoC 902 and dual-band omnidirectional antennas 920. A first WLAN module 906 may support WLAN connectivity in a first frequency range using one of the dual-band omnidirectional antennas 920. A second WLAN module 908 may support WLAN connectivity in a second frequency range using one of the dual-band omnidirectional antennas 920. The dual-band omnidirectional antennas 920 may be two omnidirectional antennas for 2.4 GHz. The directional antennas 922 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 920 and the directional antennas 922 can be implemented within a fully switchable antenna architecture controlled by micro controller 926. For example, each 5 GHz radio can choose any 2 sectors (for 2 2×2 MU-MIMO streams).

The mesh network device 900 includes a second set of WLAN modules 910-916 coupled between the SoC 902 and antenna switching circuitry 924. The second set of WLAN modules 910-916 support WLAN connectivity in the second frequency range using a set of directional antennas 922. The second set of WLAN modules 910-916 is operable to communicate with the other mesh network devices of the mesh network. The antenna switching circuitry 924 is coupled to a micro controller 926. The micro controller 926 controls the antenna switching circuitry 924 to select different combinations of antennas for wireless communications between the mesh network device 900 and the other mesh network devices, the client consumption devices, or both. For example, the micro controller 926 can select different combinations of the set of directional antennas 922.

In another embodiment, a filter switch bank is coupled between the antenna switching circuitry 924 and the second set of WLAN modules 910-916. In another embodiment, the filter switch bank can be implemented within the antenna switching circuitry 924.

In the depicted embodiment, the first set of WLAN modules include a first a first 2×2 2.4 GHz MIMO radio 906 and a 2×2 5 GHz MIMO radio 908. The second set of WLAN modules includes a first 2×2 5 GHz MIMO radio 910 ("5GLL"), a second 2×2 5 GHz MIMO radio 912 ("5GLH"), a third 2×2 5 GHz MIMO radio 914 ("5GHL"), and a fourth 2×2 5 GHz MIMO radio 916 ("5GHH"). The dual-band omnidirectional antennas 920 may include a first omnidirectional antenna and a second omnidirectional antenna (not individually illustrated in FIG. 9). The set of directional antennas 922 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 900 can handle antenna switching in a static manner. The SoC 902 can perform sounding operations with the WLAN radios to determine a switch configuration. Switching is not done on a per packet basis or at a packet level. The static switch configuration can be evaluated a few times a day by the SoC 902. The SoC 902 can include the intelligence for switching decision based on neighbor sounding operations done by the SoC 902. The micro controller 926 can be used to program the antenna switching circuitry 924 (e.g., switch matrix) since the mesh network device 900 may be based on CSMA-CA, not TDMA. Deciding where the data will be coming into the mesh network device 900 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 900 can adapt a beam patter to be essentially fixed since the mesh network devices are not intended to move once situated.

In one embodiment, the antenna switching circuitry 924 includes multiple diplexers and switches to connect different combinations of antennas to the multiple radios. One configuration for the antenna switching circuitry 924 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the network device 900.

Figure 10:
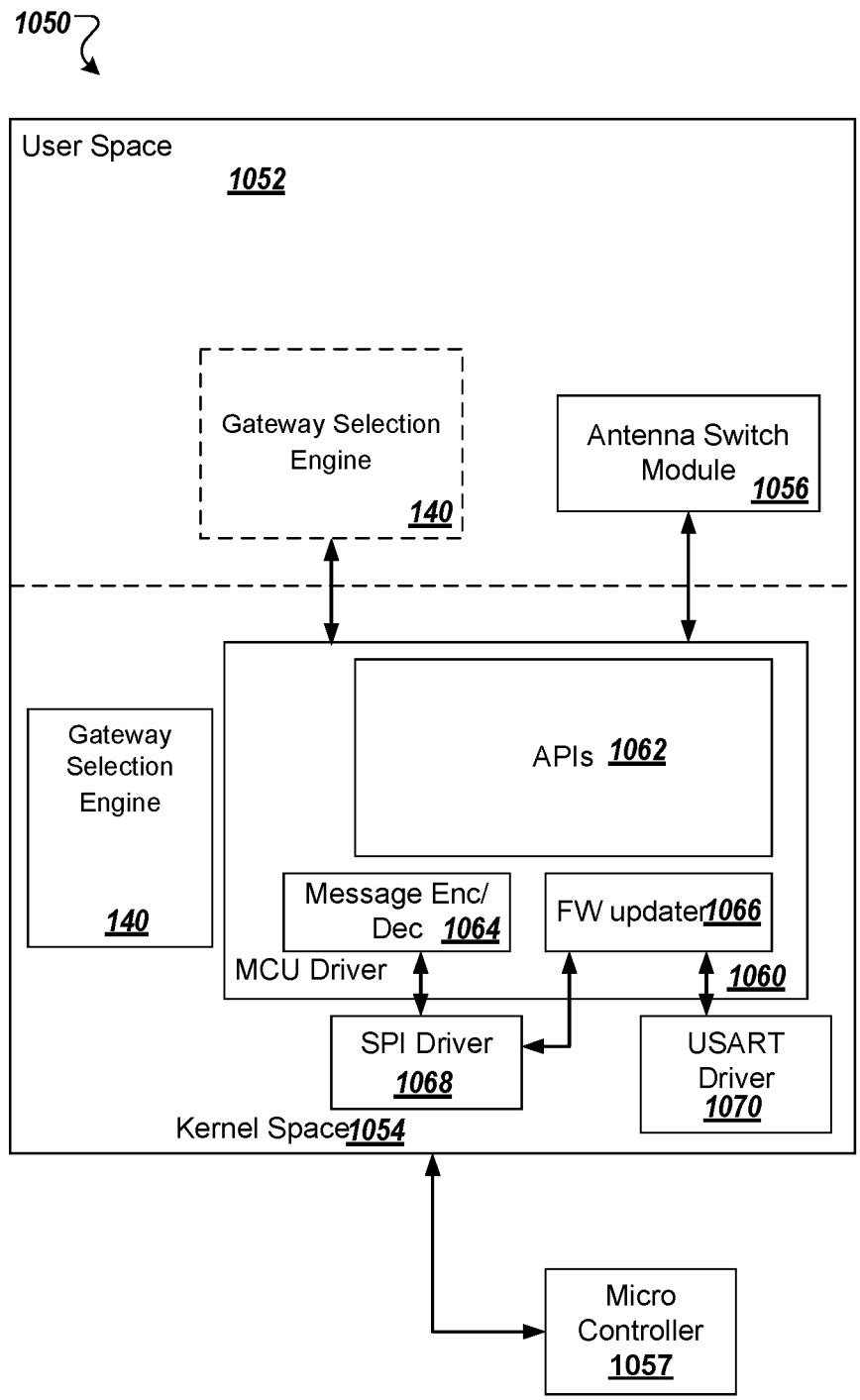
FIG. 10 is a block diagram of an application processor in which the embodiments of the present disclosure may be implemented.

FIG. 10 is a block diagram of an application processor in which the gateway selection engine 140 operates in accordance with embodiments of the present disclosure may be implemented. The application processor 1050 executes an operating system that segregates memory (virtual memory) into user space 1052 and kernel space 1054. In this embodiment, the gateway selection engine 140 runs in the user space 1052. In other embodiments, some or the entire gateway selection engine 140 can be implemented in the kernel space 1054. The gateway selection engine 140 may be instructions that when executed by the application processor 1050 perform various gateway selection operations as described herein. The application processor 1150 can communicate with neighbor network devices to route data traffic on a network backbone of multiple P2P wireless connections between the network devices.

In the kernel space 1154, a micro controller unit (MCU) driver 1160 can execute. The MCU driver 1160 may include multiple application programming interfaces (APIs) 1162 to interface to other components, such as the radios and micro controller, as described herein. The APIs 1162 can communicate messages to other components and may use a message encoder/decoder 1164 to encode and decode these messages. The APIs 1162 may include an API for getting firmware versions, an API for updating the firmware, and an API for getting radio information (e.g., radio configuration, antenna configuration, channel information, chamber/sector information, or the like). The MCU driver 1160 may also include a firmware (FW) updater 1166. Also, the kernel space 1154 may include a serial packet interface (SPI) driver 1168 and a Universal Synchronous/Asynchronous Receiver/Transmitter (USART) driver 1170.

In one embodiment, there is an interface mechanism between the user space 1152 and kernel space 1154 that has minimum latency. For example, in cases when there is an invalid configuration being input by an application, such as the gateway selection engine 140, the error should be reported as quickly as possible to the application. The application processor 1150 may also include modules in the user space 1152 or in the kernel space 1154 since the application processor 1150 could be operating in a battery-backed operating state during power outages.

Figure 11:
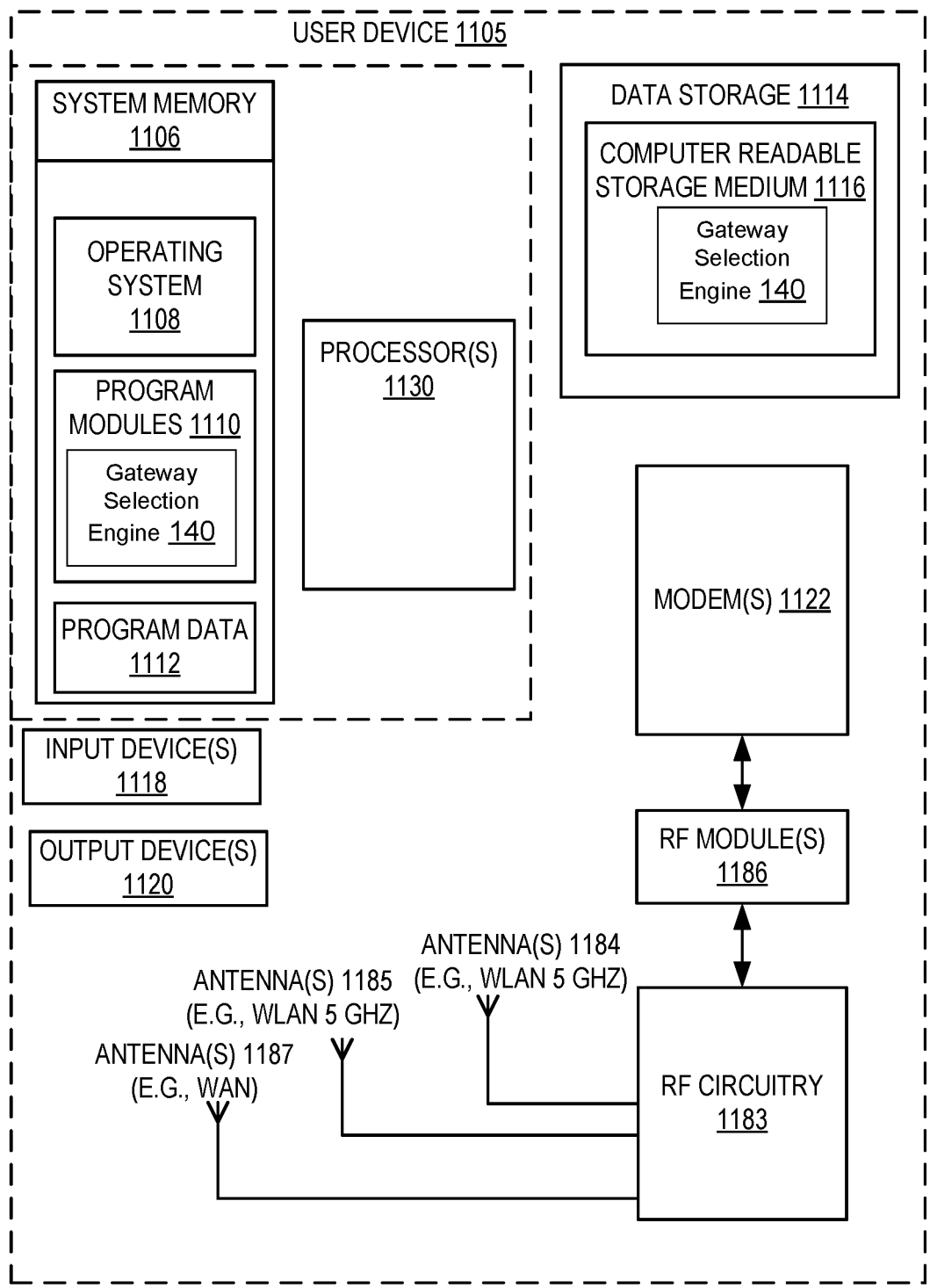
FIG. 11 is a block diagram of a network hardware device according to one embodiment.

FIG. 11 is a block diagram of a network hardware device 1100 with a gateway selection engine 140 according to one embodiment. The network hardware device 1100 may correspond to the network hardware device 102-110 of FIG. 1. In another embodiment, the network hardware device 1100 may correspond to any of the wireless mesh point stations (MP STA) 210A-210Z, mesh access points (MAP) 220A-220K, and mesh portals (MPP) 230A-220M of FIG. 2. In another embodiment, the network hardware device 1100 may correspond to the mesh node 800 of FIG. 8. In another embodiment, the network hardware device 1100 may correspond to the mesh network device 900 of FIG. 9. In another embodiment, the network hardware device 1100 may correspond to the application processor 1050 of FIG. 10. Alternatively, the network hardware device 1100 may be other electronic devices, as described herein.

The network hardware device 1100 includes one or more processor(s) 1130, such as one or more CPUs, microcontrollers, field programmable gate arrays, or other types of processors. The network hardware device 1100 also includes system memory 1106, which may correspond to any combination of volatile and/or non-volatile storage mechanisms. The system memory 1106 stores information that provides operating system component 1108, various program modules 1110, program data 1112, and/or other components. The program modules 1110 may include instructions of the gateway selection engine 140. In one embodiment, the system memory 1106 stores instructions of methods to control operation of the network hardware device 1100. The network hardware device 1100 performs functions by using the processor(s) 1130 to execute instructions provided by the system memory 1106.

The network hardware device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the network hardware device 1100, the system memory 1106 and the processor(s) 1130 also constituting computer-readable media. The network hardware device 1100 may also include one or more input devices 1118 (keyboard, mouse device, specialized selection keys, etc.) and one or more output devices 1120 (displays, printers, audio output mechanisms, etc.).

The network hardware device 1100 further includes a modem 1122 to allow the network hardware device 1100 to communicate via a wireless connections (e.g., such as provided by the wireless communication system) with other computing devices, such as remote computers, an item providing system, and so forth. The modem 1122 can be connected to one or more RF modules 1186. The RF modules 1186 may be a WLAN module, a WAN module, PAN module, GPS module, or the like. The antenna structures (antenna(s) 1184, 1185, and 1187) are coupled to the RF circuitry 1183, which is coupled to the modem 1122. The RF circuitry 1183 may include radio front-end circuitry, antenna switching circuitry, impedance matching circuitry, or the like. In one embodiment, the RF circuitry 1183 includes the RFFE circuitry with high selectivity performance as described in the various embodiments of FIGS. 5-12. The antennas 1184 may be GPS antennas, NFC antennas, other WAN antennas, WLAN or PAN antennas, or the like. The modem 1122 allows the network hardware device 1100 to handle both voice and non-voice communications (such as communications for text messages, multi-media messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4 GHz), and/or antenna(s) 1187 of a third type (e.g., WAN), via RF circuitry 1183, and RF module(s) 1186 as descried herein. Antennas 1184, 1185, and 1187 may be configured to transmit in different frequency bands and/or using different wireless communication protocols. The antennas 1184, 1185, and 1187 may be directional, omnidirectional, or non-directional antennas. In addition to sending data, antennas 1184, 1185, and 1187 may also receive data, which is sent to appropriate RF modules connected to the antennas. One of the antennas 1184, 1185, 1187 may be any combination of the antenna structures described herein.

In one embodiment, the network hardware device 1100 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the mesh network and the second wireless connection may be associated with serving a content file to a client consumption device, as described herein.

Though a modem 1122 is shown to control transmission and reception via antenna (1184, 1185, 1187), the network hardware device 1100 may alternatively include multiple modems, each of which is configured to transmit/receive data via a different antenna and/or wireless transmission protocol.

Figure 12:
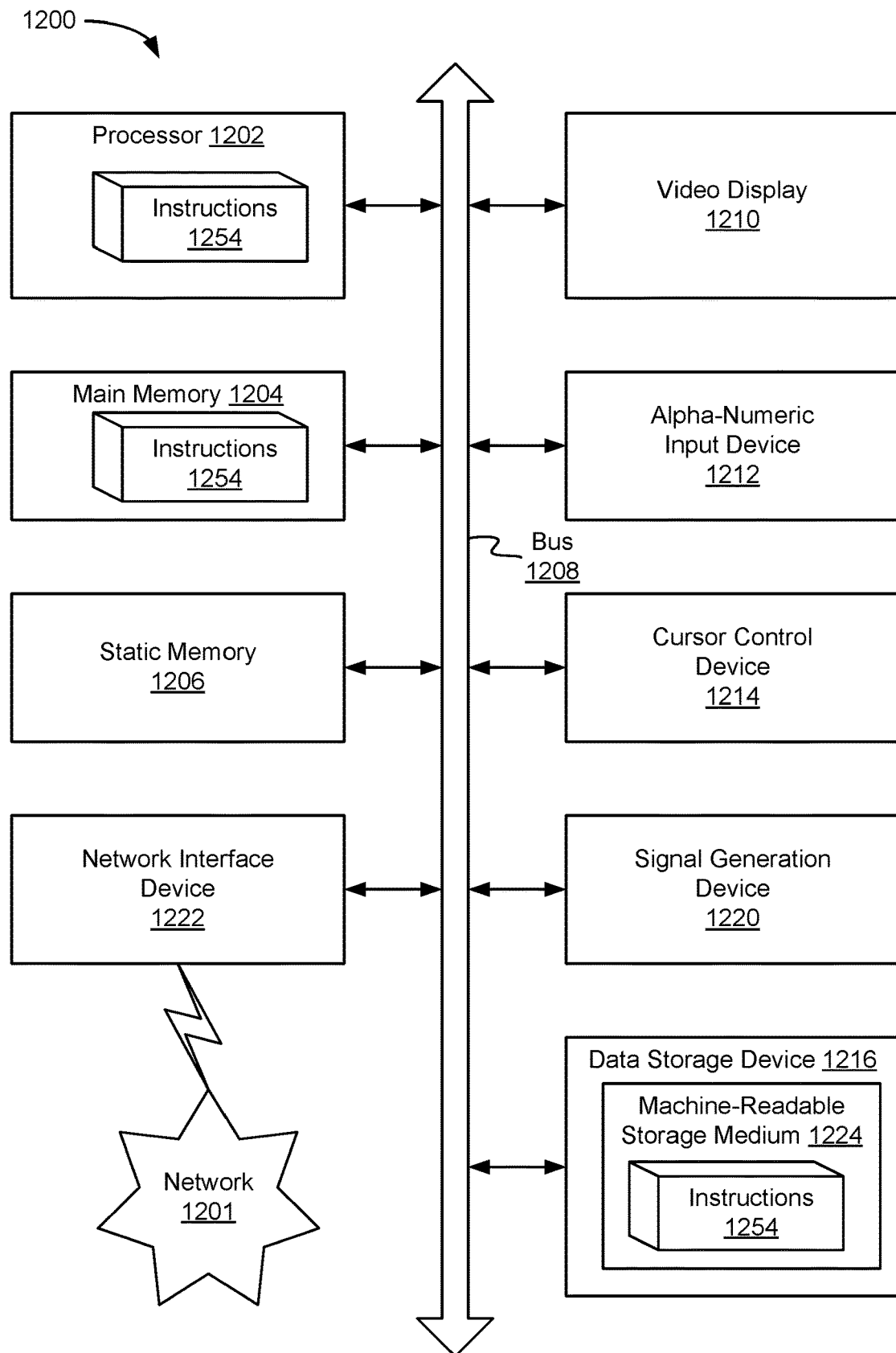
FIG. 12 illustrates a component diagram of a computer system which may implement one or more methods described herein.

FIG. 12 illustrates a component diagram of a computer system which may implement one or more methods of gateway selection as described herein. A set of instructions for causing the computer system 1200 to perform any one or more of the methods discussed herein may be executed by the computer system 1200. In one embodiment, the computer system 1200 may implement the functions of the gateway selection engine 140 of FIG. 1. Alternatively, the computer system 1200 may implement functions of the gateway selection engine 140 in a central entity.

In one embodiment, the computer system 1200 may be connected to other computer systems by a network 1201 provided by a Local Area Network (LAN), an intranet, an extranet, the Internet or any combination thereof. The computer system may operate in a collection of one or more computers to implement a cloud computing system. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 1200 includes a processing device 1202, a main memory 1204 (e.g., read-only memory (ROM), flash memory, dynamic random access memory (DRAM) such as synchronous DRAM (SDRAM), etc.), a static memory 1206 (e.g., flash memory, static random access memory (SRAM), etc.) and a data storage device 1216, which communicate with each other via a bus 1208.

In one embodiment, the processing device 1202 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1202 may therefore include multiple processors. The processing device 1202 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor or the like.

In one embodiment, the computer system 1200 may further include one or more network interface devices 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker).

In one embodiment, the data storage device 1218 may include a computer-readable storage medium 1224 on which is stored one or more sets of instructions 1254 embodying any one or more of the methods or functions described herein. The instructions 1254 may also reside, completely or at least partially, within the main memory 1204 and/or within the processing device 1202 during execution thereof by the computer system 1200; the main memory 1204 and the processing device 1202 also constituting machine-readable storage media.

While the computer-readable storage medium 1224 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of gateway selection in a mesh network, the method comprising:
   detecting that a first root node computing device of the mesh network has been activated or reactivated after a period of non-operation;
   generating first Root Node Announcement (RANN) information comprising information about (i) a type of backhaul connection between the first root node computing device and one or more network resources external to the mesh network and (ii) a cost metric for each of one or more mesh nodes in the mesh network, the cost metric defining a cost associated with utilizing the first root node computing device to access the one or more network resources, the one or more mesh nodes not having direct access to the one or more network resources;
   sending, by the first root node computing device with a first frequency, first announcement messages comprising the first RANN information to the one or more mesh nodes in the mesh network;
   determining that a number of the announcement messages meets or exceeds a threshold amount, wherein the threshold amount increases in proportion to a total number of mesh nodes in the mesh network; and
   sending, by the first root node computing device, second announcement messages comprising the first RANN information with a second frequency, wherein the second frequency is lower than the first frequency.

2. The method of claim 1, further comprising:
   determining that a battery level of the first root node computing device has fallen below a threshold;
   generating second RANN information comprising a first value indicating the type of the backhaul connection of the first root node computing device and a second value for the cost metric, wherein a presence of both the first value and the second value in the second RANN information indicates that the first root node computing device is going to power down; and
   sending an announcement message comprising the second RANN information to the one or more mesh nodes.

3. The method of claim 1, wherein the mesh network comprises a plurality of root node computing devices sending announcement messages, the plurality of root node computing devices including the first root node computing device, and wherein the second frequency decreases as a number of the plurality of root node computing devices increases.

4. A first computing device comprising:
   one or more processors; and
   memory to store computer-executable instructions that, if executed, cause the one or more processors to:
      determine that the first computing device is active;
      send a first announcement message to one or more nodes in a mesh network, wherein the first computing device is connected to the mesh network;
      send a second announcement message to the one or more nodes in the mesh network after a first period of time has passed since the first announcement message was sent;
      determine that a threshold number of announcement messages have been sent by the first computing device; and
      send a third announcement message to the one or more nodes in the mesh network after a second period of time has passed since a previous announcement message was sent, wherein the second period of time is longer than the first period of time.

5. The first computing device of claim 4, wherein the first announcement message includes information indicating that the first computing device has direct access to a network resource external to the mesh network.

6. The first computing device of claim 5, wherein the first announcement message comprises information about a type of connection between the first computing device and the network resource external to the mesh network and information about a metric defining a cost associated with utilizing the first computing device to communicably couple each of the one or more nodes in the mesh network to the network resource external to the mesh network.

7. The first computing device of claim 4, wherein the first announcement message comprises at least one of Gateway Announcement (GANN) information or Root Node Announcement (RANN) information.

8. The first computing device of claim 4, wherein the threshold number of announcement messages is proportional to a number of nodes in the mesh network.

9. The first computing device of claim 4, wherein the mesh network comprises a plurality of gateway nodes each sending announcement messages, the plurality of gateway nodes including the first computing device, and wherein the second period of time is proportional to a number of the plurality of gateway nodes.

10. The first computing device of claim 3, wherein the one or more processors to send the first announcement message in at least one of a broadcast format or a unicast format to the one or more nodes in the mesh network.

11. The first computing device of claim 4, wherein the instructions further cause the one or more processors to:
   determine that the first computing device is going to power down; and
   send a fourth announcement message to the one or more nodes, the fourth announcement message comprising information usable by the one or more nodes to communicably couple to a second computing device that has direct access to a network resource external to the mesh network.

12. The first computing device of claim 11, wherein information indicating that the first computing device is going to power down comprises at least one of a battery level of the first computing device being below a battery threshold amount or a signal strength of a connection between the first computing device and the network resource external to the mesh network being below a signal strength threshold amount.

13. The first computing device of claim 11, wherein the information in the fourth announcement message comprises a first value for a type of backhaul connection and a second value for a cost metric, wherein a presence of both the first value and the second value in the fourth announcement message indicates that the first computing device is going to power down.

14. A method comprising:
   receiving, by a first mesh node in a mesh network, a first message from another node in the mesh network, the first message comprising a first identifier of a first gateway node in the mesh network from which the first message originated and information about a first number of intermediate nodes in a first signal path between the first gateway node and the first mesh node;
   determining a value indicating a time period for which the first mesh node can use the first gateway node to access a network resource external to the mesh network, wherein the value reflects the information about the first number of intermediate nodes; and
   utilizing the first gateway node to access the network resource external to the mesh network until the time period expires.

15. The method of claim 14, further comprising:
   determining an increase the first number of intermediate nodes;
   increasing the time period;
   detecting an expiration of the time period; and
   communicably coupling to a second gateway node in the mesh network.

16. The method of claim 14, wherein the first message comprises at least one of Gateway Announcement (GANN) information or Root Node Announcement (RANN) information.

17. The method of claim 14, wherein the first message comprises information about a first type of backhaul connection between the first gateway node and the network resource external to the mesh network and information about a first cost metric defining a cost to the first mesh node associated with utilizing the first gateway node.

18. The method of claim 17, further comprising:
   receiving, by the first mesh node, a second message from another node in the mesh network, the second message comprising a second identifier of a second gateway node in the mesh network from which the second message originated and information about a second number of intermediate nodes in a second signal path between the second gateway node and the second mesh node, the second gateway node having an associated second type of backhaul connection and a second cost metric;
   communicably coupling with the first gateway based on the first type of backhaul connection and the first cost metric and a second type of backhaul connection and the second cost metric; and
   storing, by the first mesh node, the second identifier.

19. The method of claim 18, further comprising:
   generating a third message using the first announcement message, the third message comprising the first identifier of the first gateway and the second identifier of the second gateway; and
   sending the third message to another mesh node in the mesh network.

20. The method of claim 18, further comprising:
   receiving, by the first mesh node, a fourth message from another node in the mesh network, the fourth message comprising an identifier of the first gateway node in the mesh network from which the fourth message originated, a first value for a type of backhaul connection and a second value for a cost metric, wherein a presence of both the first value and the second value in the fourth message indicates that the first gateway node is going to power down; and
   utilizing the second gateway node to access the network resource external to the mesh network.

* * * * *